United States Patent
Nakamura et al.

(10) Patent No.: US 7,652,803 B2
(45) Date of Patent: Jan. 26, 2010

(54) DRIVING DEVICE OF LIGHT SOURCE

(75) Inventors: Tetsuroh Nakamura, Hyogo-ken (JP); Masakazu Mizusaki, Fukuoka-ken (JP); Ken-ichi Masumoto, Osaka-fu (JP)

(73) Assignee: Panasonic Corporation, Osaka (JP)

( * ) Notice: Subject to any disclaimer, the term of this patent is extended or adjusted under 35 U.S.C. 154(b) by 101 days.

(21) Appl. No.: 11/730,616

(22) Filed: Apr. 3, 2007

(65) Prior Publication Data

US 2007/0183005 A1    Aug. 9, 2007

Related U.S. Application Data

(62) Division of application No. 10/214,577, filed on Aug. 9, 2002, now Pat. No. 7,224,497.

(30) Foreign Application Priority Data

| Aug. 9, 2001 | (JP) | ............................... 2001-241664 |
| Aug. 9, 2001 | (JP) | ............................... 2001-241665 |
| Aug. 9, 2001 | (JP) | ............................... 2001-241666 |

(51) Int. Cl.
*H04N 1/04*   (2006.01)

(52) U.S. Cl. ................ 358/474; 358/487; 358/509; 358/475; 358/480; 250/208.1; 250/216; 382/274; 382/275; 359/618; 359/621; 347/58; 347/225; 345/860; 345/78

(58) Field of Classification Search ............... 358/474, 358/487, 475, 509, 486, 512, 518, 480, 513, 358/514, 515, 520; 250/208.1, 216; 382/275, 382/274, 264, 132; 359/618, 619, 621; 347/58, 347/225, 70, 138, 130; 345/78, 860, 225
See application file for complete search history.

(56) References Cited

U.S. PATENT DOCUMENTS 5,548,573 A  *  8/1996  Takeuchi .................... 369/116

(Continued)

FOREIGN PATENT DOCUMENTS

JP          10-178214          6/1998

(Continued)

OTHER PUBLICATIONS

Japanese Office Action issued in Japanese Patent Application No. 2002-229427, dated Feb. 16, 2007.

*Primary Examiner*—Negussie Worku
(74) *Attorney, Agent, or Firm*—McDermott Will & Emery LLP

(57) ABSTRACT

The object of the invention is to extend the life of the light source while uniformizing the illuminance intensity in the main scanning direction. The invention is based on a light source of image reading apparatus comprised of film layers laminated on a transparent substrate in the order of a transparent electrode, an area light emitter and a metal electrode, and emitting light by impressing a specific voltage on these two electrodes. And an area light emitter column configured by arranging area light emitters corresponding to each color of R (red), G (green) and B (blue) in the sub scanning direction, or a monochrome area light emitter is arranged repeatedly in the main scanning direction. Accordingly, even when somewhere in the light emitting element has a defect like the film thickness is thin, the current gathering at this point with the low resistance value becomes a very small volume. Therefore, it would not occur that the film burns out from here.

30 Claims, 27 Drawing Sheets

U.S. PATENT DOCUMENTS

| | | | |
|---|---|---|---|
| 5,592,218 A * | 1/1997 | Ochiai et al. | 348/110 |
| 6,195,183 B1 * | 2/2001 | Fujimoto et al. | 358/514 |
| 6,236,416 B1 * | 5/2001 | Kuribayashi et al. | 347/118 |
| 6,297,874 B1 * | 10/2001 | Ikeda et al. | 355/40 |
| 6,330,081 B1 * | 12/2001 | Scholten | 358/463 |
| 6,493,114 B1 * | 12/2002 | Liu | 358/509 |
| 6,563,962 B1 * | 5/2003 | Sakaguchi | 382/298 |
| 6,643,038 B1 * | 11/2003 | Kawahara et al. | 358/512 |
| 6,882,379 B1 * | 4/2005 | Yokoyama et al. | 349/61 |
| 6,891,328 B2 * | 5/2005 | Nakamura et al. | 313/506 |
| 6,952,294 B2 * | 10/2005 | Ishikawa et al. | 358/505 |
| 7,173,234 B2 * | 2/2007 | Hiromatsu | 250/226 |
| 7,224,497 B2 * | 5/2007 | Nakamura et al. | 358/474 |
| 7,440,149 B2 * | 10/2008 | Steinebach | 358/474 |

FOREIGN PATENT DOCUMENTS

| | | |
|---|---|---|
| WO | WO 0207427 | 1/2002 |

* cited by examiner

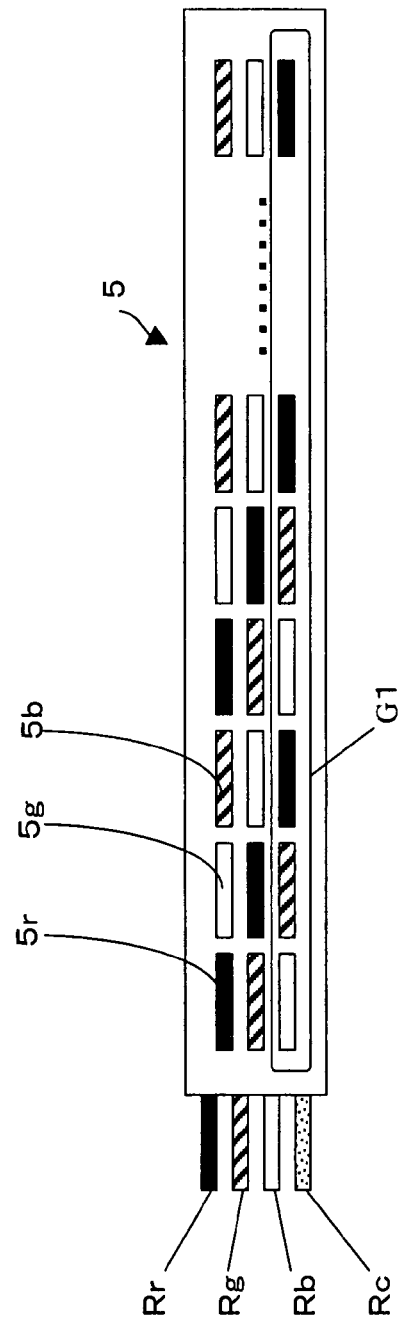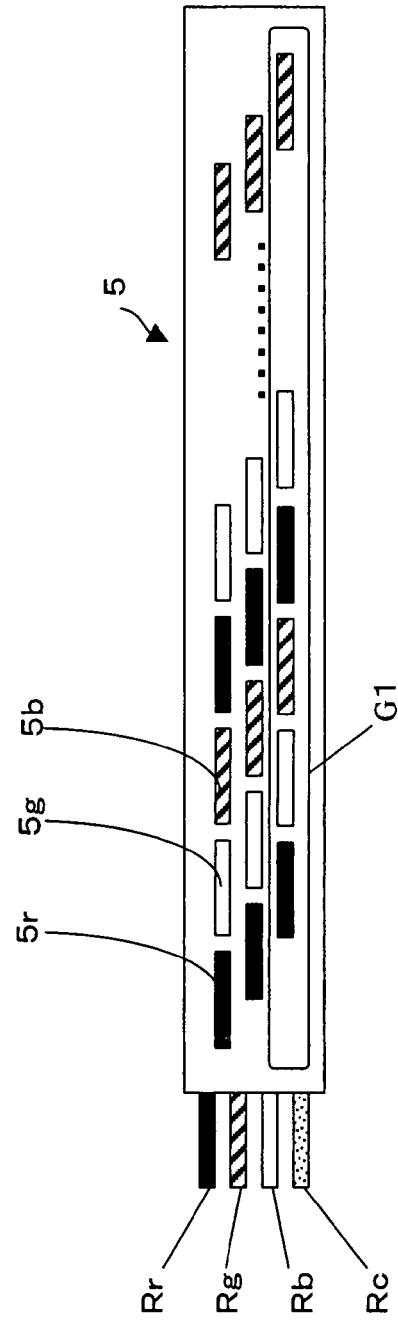

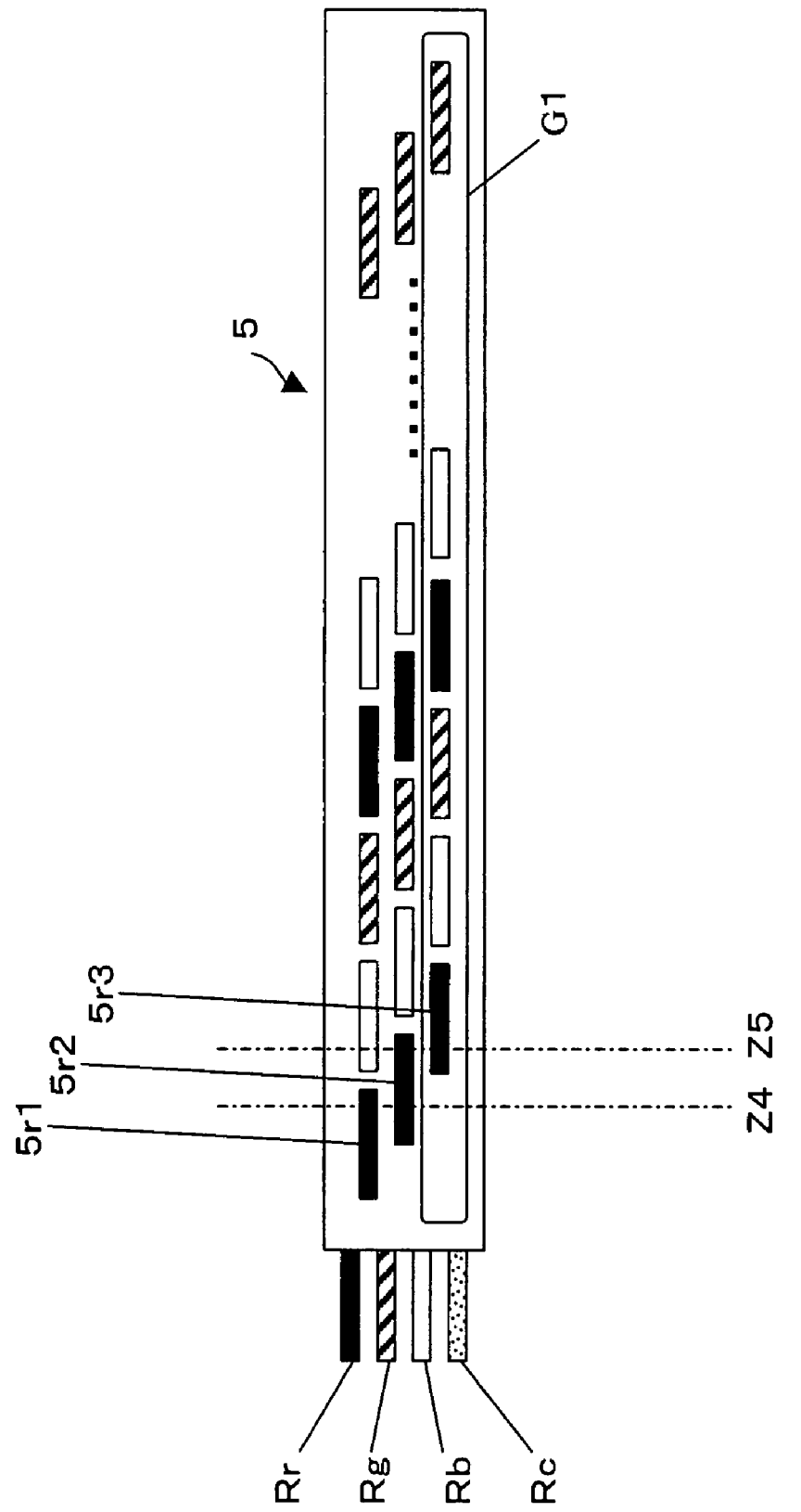

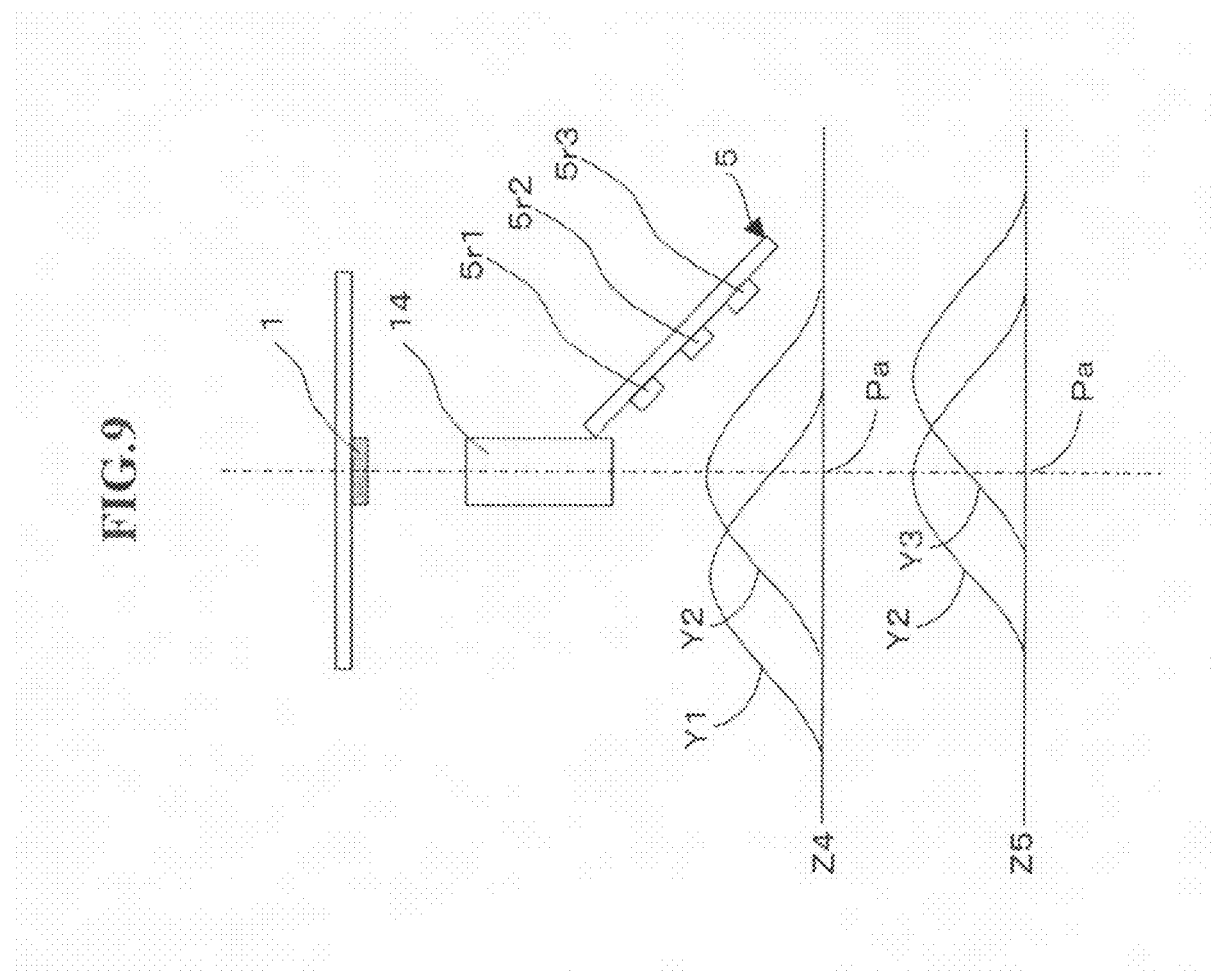

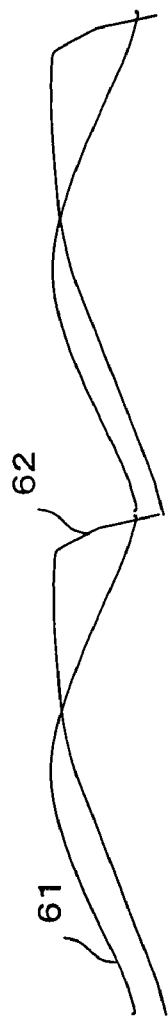
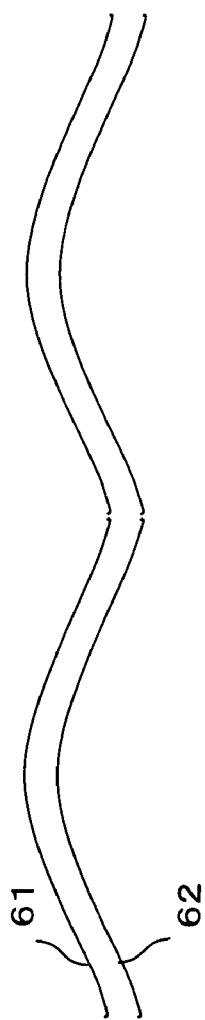

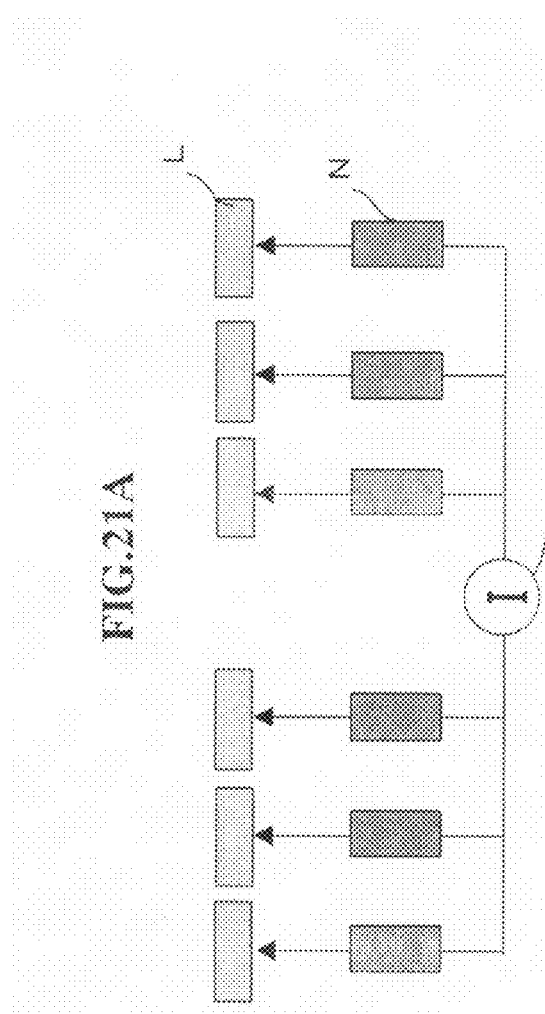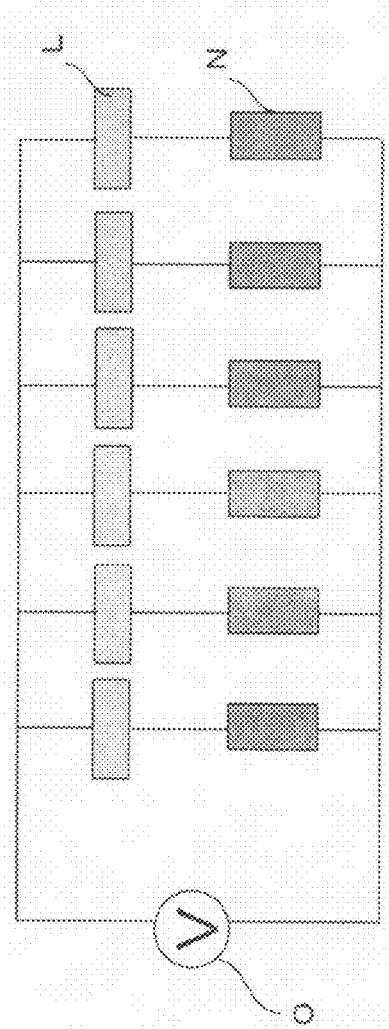
FIG.21A
FIG.21B

DRIVING DEVICE OF LIGHT SOURCE

RELATED APPLICATIONS

The present application is a Divisional of U.S. application Ser. No. 10/214,577, filed on Aug. 9, 2002, now U.S. Pat. No. 7,224,497 which claims priority from Japanese Application No. JP 2001-241664 filed on Aug. 9, 2001, Japanese Application No. JP 2001-241665, filed on Aug. 9, 2001, and Japanese Application No. JP 2001-241666, filed Aug. 9, 2001 the contents of which are hereby incorporated by reference.

BACKGROUND OF THE INVENTION

1. Field of the Invention

This invention relates to a light source of the image reading apparatus.

2. Description of the Related Art

The multifunctional printer combining functions of the copying machine, the scanner, the printer, and the facsimile machine, is provided with an image reading apparatus that optically reads images illustrated on an original.

The reduction optical system (the reduction CCD System) has been well known as the above-mentioned image reading apparatus. The reduction optical system has a merit that it is possible to obtain clear images by making the focal depth of the lens large even in case where the original is lifted from the original plate, and meanwhile, there is a demerit that such mechanism made the apparatus large. Therefore, in case of considering the downsizing and thin body of the apparatus, the contact type optical system is adopted in general wherein the information of the original is led to a sensor 108 with the same magnification of the erected image, as shown in FIG. 22.

Specifically, two LED arrays 112 are placed symmetrically each other over the original surface 106 at a specific oblique angle. At the position over a center between two LED arrays 112, a rod lens array 121 is placed. The rod lens array 121 receives light emitted on the original surface 106.

The LED array 112 is formed by arranging plural LED elements 125 on a substrate 124 as shown in FIG. 23. The rod lens array 121 is formed by arranging a specific number of a cylindrical rod lens 122 adjacently and holding them by the substrate 124 as shown in FIG. 24.

Using such contract type optical system configured as above makes the distance between the original surface 106 and the rod lens 122 short, therefore it is possible to downsize the apparatus appreciably.

In order to downsize the apparatus, this is also an important thing that the light source is placed at a position as closer to the original surface as possible. However, since the conventional type of the LED array is an aggregate of point sources, this light source must have a specific distance from the original surface in order to ensure the luminance uniformity. That is to say, there is a limit to promote the downsizing of the apparatus by using the conventional LED array.

Therefore, the applicants of this invention have disclosed in Japanese Patent Application No. 2000-217561 that the following electro luminescence film is used as the area light emitting source.

Specifically, as shown in FIG. 25, a transparent electrode film 103 is formed in the main scanning direction on the transparent substrate 101 of a long glass or transparent resin, on which the electro luminescence film 100 as the light medium is formed, and finally a metal electrode 102 is laminated on the upper surface.

In addition, in case where such area light emitting source is carried out in color, since the illuminance must be uniformized in the main scanning direction, the electro luminescence films 100r, 100g and 100b in the same width corresponding to each color of R (red), G (green), and B (blue) are formed in the sub scanning direction, as shown in FIG. 26.

As shown in FIG. 27, two area light emitting source 5 are arranged symmetrically over the original 9 with keeping a specific interval. Thereby the light emitted on the original is led to the sensor 1 through the lens 14 placed over the center between two area light emitting sources 5.

Even if the area light emitting source comes up to a reading position Pa, the uniform illuminance can be obtained at this reading position Pa. Therefore, it is possible to promote the downsizing of the apparatus by using the area light emitting source 5 proposed by the applicants instead of the conventional LED array.

However, there is a problem that the area light emitting source adopting the electro luminescence film 100r, 100g and 100b has a short life. As shown in FIG. 26, if somewhere, a point X, has a defect like the film thickness is thin, the current gathering at this point X of which the resistance value is low, and the electro luminescence film 100b burns out from this point.

The invention is proposed based on the above-mentioned conventional problems, and has an object to extend the life span of the light source of the image reading apparatus while uniformizing the illuminance in the main scanning direction.

SUMMARY OF THE INVENTION

In order to achieve the above object, the invention adopts the following means.

Specifically, the invention is based on a light source of the image reading apparatus comprised of film layers laminated on a transparent substrate in the order of a transparent electrode, an area light emitter and a metal electrode, and emitting light by impressing a specific voltage on these two electrodes. It is arranged that an area light emitter column configured by arranging the area light emitters corresponding to each color of R (red), G (green) and B (blue) in the sub scanning direction, or a monochrome area light emitter is arranged repeatedly in the main scanning direction.

According to the above-mentioned configuration that the light emitting area is divided into plural area light emitters, even when any point has a defect like the film thickness is thin, the current gathering at this point with the low resistance value becomes a very small volume. Therefore, it will not occur the trouble that the film burns out from here.

BRIEF DESCRIPTION OF THE DRAWINGS

FIGS. 5A and 5B are diagrams of the color area light emitting source to which the invention is applied.

FIG. 8 is an explanatory diagram of the phases Z4 and Z5.

FIG. 9 is a diagram showing the illuminance distribution of the sub scanning direction of the phases Z4 and Z5.

FIGS. 10A and 10B are explanatory diagrams of the illuminance dispersion.

FIGS. 21A and 21B are diagrams showing the configuration for driving the light emitting element.

DESCRIPTION OF THE PREFERRED EMBODIMENTS

The following explains in detail about the preferred embodiments of the invention according to the attached drawings. In the description, there is a case that an area light emitter composing a light emitting area is called a "light emitting element".

Embodiment 1

Figure 27:
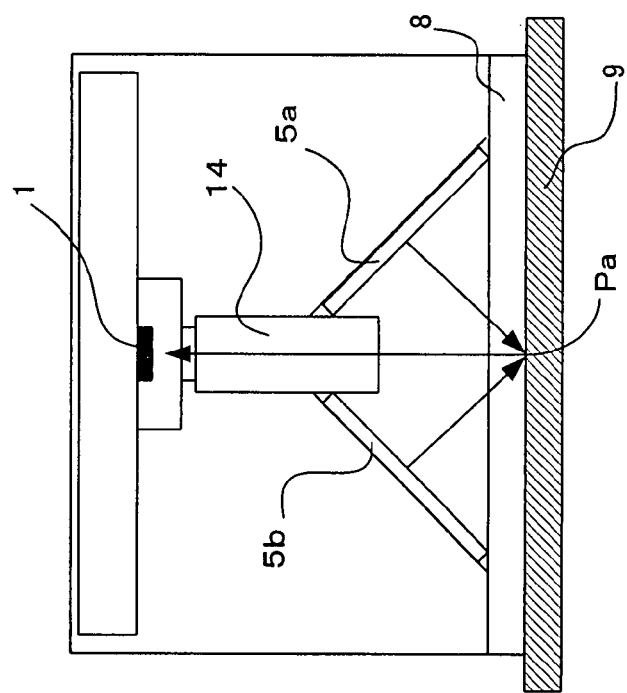
FIG. 27 is a block diagram of the image reading apparatus adopting the area light emitting source.

The invention is based on a light source of the image reading apparatus that is comprised of film layers laminated on a transparent substrate in the order of a transparent electrode, an area light emitter and a metal electrode, and that emits light by impressing a specific voltage on these two electrodes. The invention is described based on a configuration provided with two light sources 5 as shown in FIG. 27, however, the invention is not limited only to this. More specifically, the applicable range of the invention may also include the configuration provided with either one of these two light sources, in addition to the configuration with two light sources.

The following description notes only the differences from the conventional art.

Figure 1:
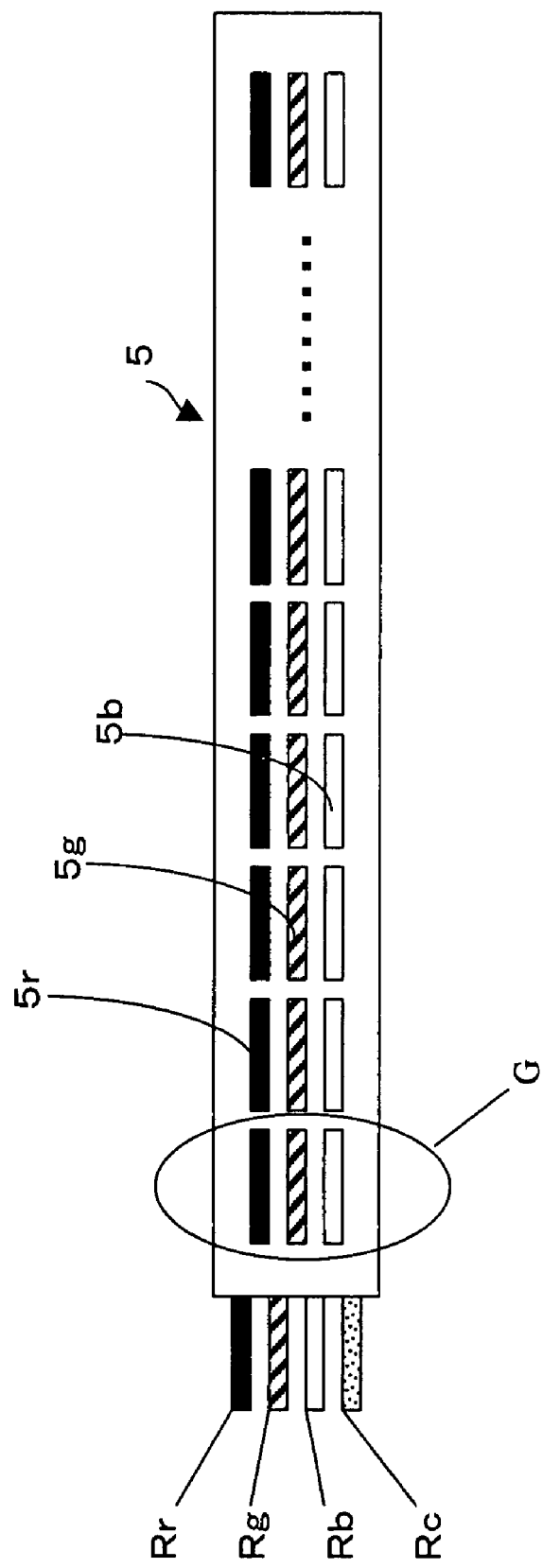
FIG. 1 is a block diagram of the color area light emitting source to which the invention is applied.

First of all, it is arranged in the invention as shown in FIG. 1 that an area light emitter column G, in which area light emitters 5r, 5g and 5b in the same width and length corresponding to each color R (red), G (green) and B (blue) are arranged in the sub scanning direction, is arranged repeatedly in the main scanning direction.

According to the configuration that the light emitting area of area light emitter is divided into pieces, even when any point has a defect like the film thickness is thin, the current gathering at this point with the low resistance value becomes a very small volume. Therefore, it will not occur any problem that the film burns out from here, and in result it is possible to extend the life span of the light source of the image reading apparatus.

Besides, respective leads Rr, Rg and Rb as shown in this drawing are connected with the transparent electrodes for the area light emitters 5r, 5g and 5b, while the lead Rc is connected with the metal electrode (the common electrode).

Here, in the process of producing the area light emitter, a specific interval is required between the light emitting elements. Accordingly, if the light emitting area of the area light emitter is divided into pieces too much, this results in the decrease of the proportion of the light emitting area to the whole area of the light source (which is called the "aperture ratio" hereinafter).

Figure 2:
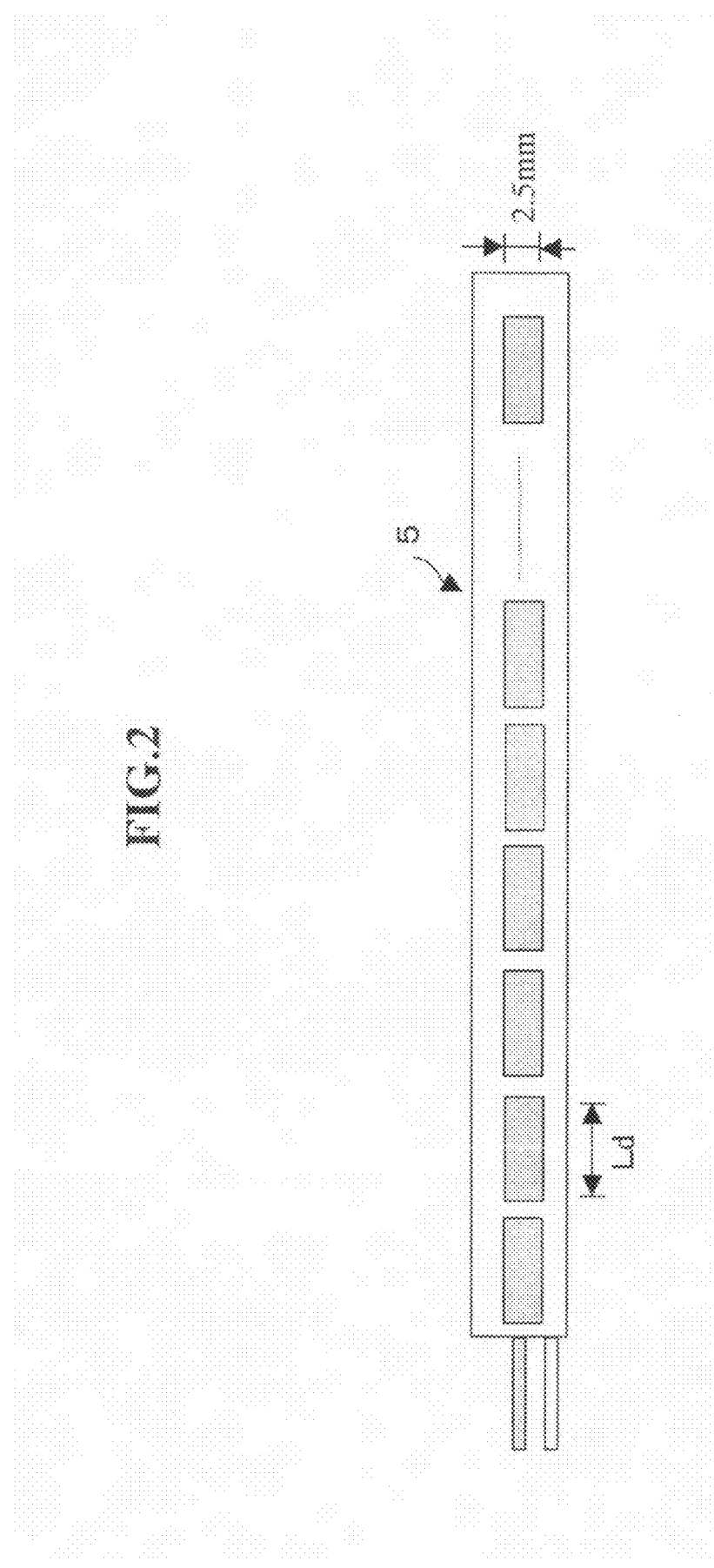
FIG. 2 is a block diagram of the area light emitting source applied to the experiment.
Figure 3:
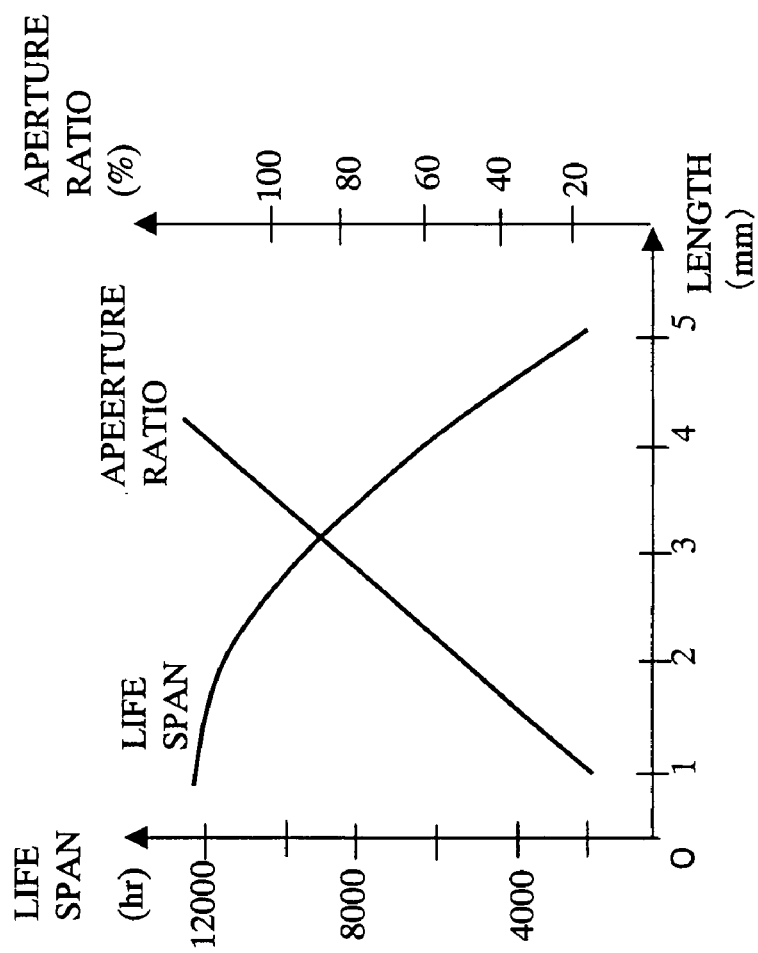
FIG. 3 is a diagram representing the correlation between the life and the aperture ratio.

Therefore, in order to determine the optimum area of the light emitting element, the life span of the light emitting element 2.5 mm in width is measured by verifying the length Ld, as shown in FIG. 2. In result, as shown in FIG. 3, it can be understood that the larger the area of the light emitting element becomes, the shorter the life of the light emitting element gets in parabolic while the higher the aperture ratio becomes in the straight line.

It seems that the most appropriate length of the light emitting element should be about 3 mm. That is to say, it can be found that, where the area of the light emitting element is about 7.5 mm$^2$ (2.5 mm×3 mm), it is possible to obtain 80% and more of the aperture ratio and to make the life span 8000 hrs and more.

As described above, by making the area of the area light emitter correspond to the area determined by the correlation between the life of the light source and the aperture ratio, the invention can extend the life of the light source of the image reading apparatus with keeping the sufficient aperture ratio.

Beside, it is possible in the embodiment to obtain the result that seems to be most appropriate when the area of the light emitting element is about 7.5 mm$^2$, but this area is not limited to this value. That is to say, the correlation between the life of the light source and the aperture ratio will depend on various conditions; for instance, the film thickness, the process condition of producing the film, the cleaning conditions of the apparatus and so on. Therefore, the area of the light emitting element, which is seemed to be optimum, will change according to such various conditions.

In addition, the above description refers to an example of the monochrome area light emitting source; however, the invention is not limited to this. That is to say, the area of the area light emitting source should be corresponding to the area determined by the correlation between the life of the light source and the aperture ratio, which is also applied to the color area light emitting source.

Embodiment 2

As described above, it is described in the embodiment 1 that the area light emitter column G configured by arranging the area light emitters 5r, 5g and 5b in the same width and length corresponding to each RGB color in the sub scanning direction is arranged repeatedly in the main scanning direction. According to such configuration, it is possible to extend the life of the light source of the image reading apparatus while obtaining the sufficient aperture ratio.

However, such area light emitting source can uniform the illuminance distribution in the main scanning direction, however, the illuminance distribution in the sub scanning direction cannot be uniformized. In other words, the area light emitters 5r, 5g, and 5b corresponding to each RGB color appears at a specific interval in the sub scanning direction, accordingly the illuminance distribution of each RGB color in the sub scanning direction indicates a wave form wherein the specific interval is a period.

Figure 4:
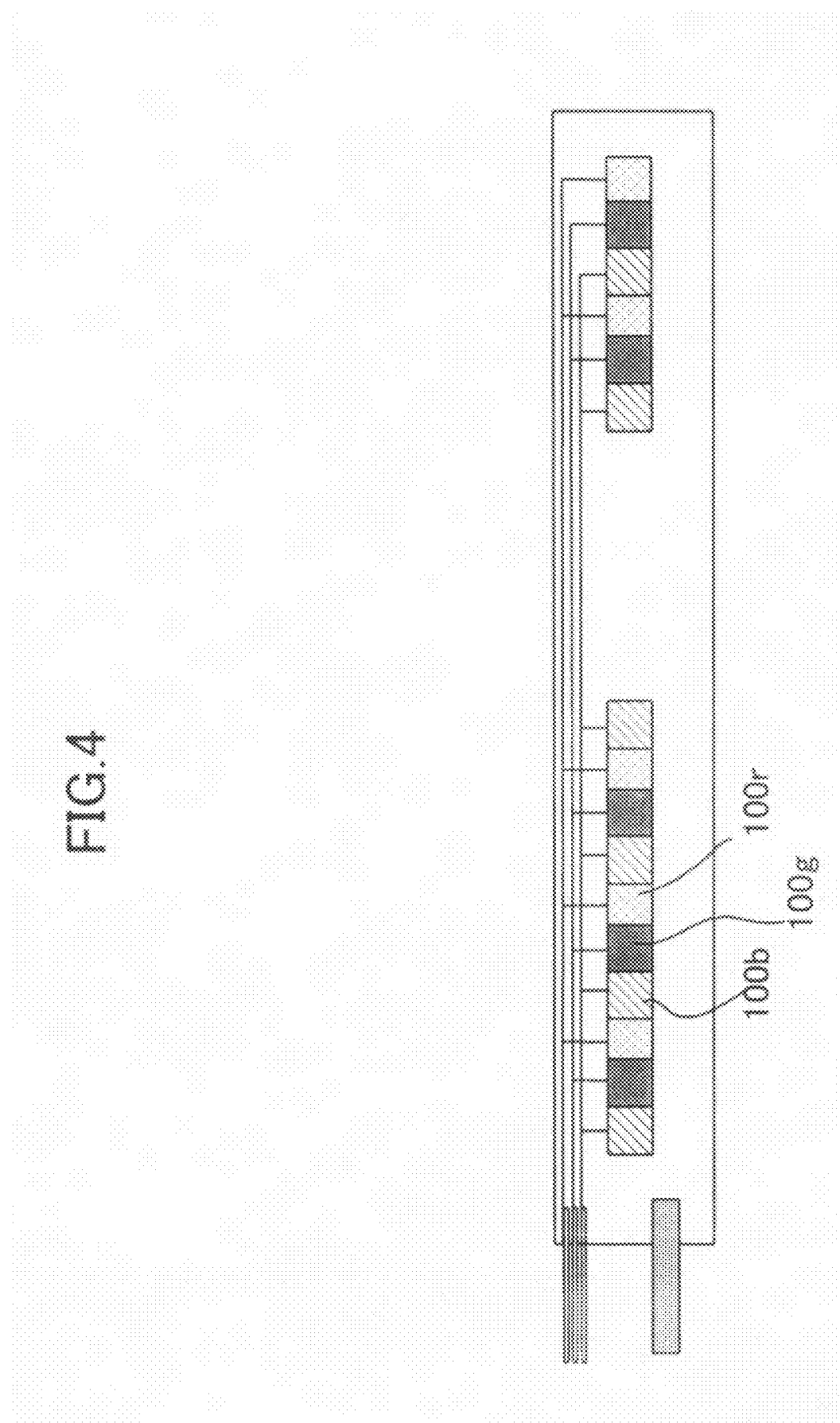
FIG. 4 is an explanatory diagram of the color area light emitting source using the electro luminescence film.

In order to settle the above problem, it may be configured as shown in FIG. 4 that the area light emitters 100r, 100g and 100b in the same width corresponding to each RGB color be arranged repeatedly in the main scanning direction. According such configuration, any one of the area light emitters 100r, 100g and 100b is to appear without fail, therefore it is possible to uniformize the illuminance distribution in the sub scanning direction of each RGB color.

However, such area light emitting source can uniform the illuminance distribution in the sub scanning direction, but the illuminance distribution in the main scanning direction cannot be uniformized. That is to say, in the main scanning direction, the area light emitters 100r, 100g and 100b corresponding to each RGB color are to appear at the specific interval, therefore the illuminance distribution in the main scanning direction corresponding to each RGB color indicates a wave form wherein such interval is a period.

The following describes about this embodiment regarding the differences from the embodiment 1.

First of all, in this embodiment, a plurality of area light emitter rows G1 are arranged in the sub scanning direction so that each phase of the main scanning direction will be shifted for one length of the area light emitter, as shown in FIG. 5A. The area light emitter row G1 is a row wherein the area light emitters 5r, 5g and 5b in the same width and length corresponding to each RGB color are arranged repeatedly in the main scanning direction.

The above-mentioned configuration, because the area light emitters 5r, 5g and 5b corresponding to each RGB color is to appear without fail even in any phase of the main scanning direction, can uniform the illuminance distribution of each RGB color in the main scanning direction. Additionally, since the area light emitters 5r, 5g and 5b corresponding to each RGB color is to appear without fail even in any phase of the sub scanning direction, it is also possible to uniform the illuminance distribution of each RGB color in the sub scanning direction.

Alternatively, as shown in FIG. 5B, a plurality of area light emitter rows G1 may be arranged in the sub scanning direction so that each phase of the main scanning direction should be shifted for half length of the area light emitter. And in fact, such configuration, as compared the configuration adopting the light source as shown in FIG. 5A, reduces the effect to uniform the illuminance distribution of each RGB color in the main scanning direction just a little, but there is a merit that a illuminance peak point of the sub scanning direction appears nearby the reading position.

Figure 6:
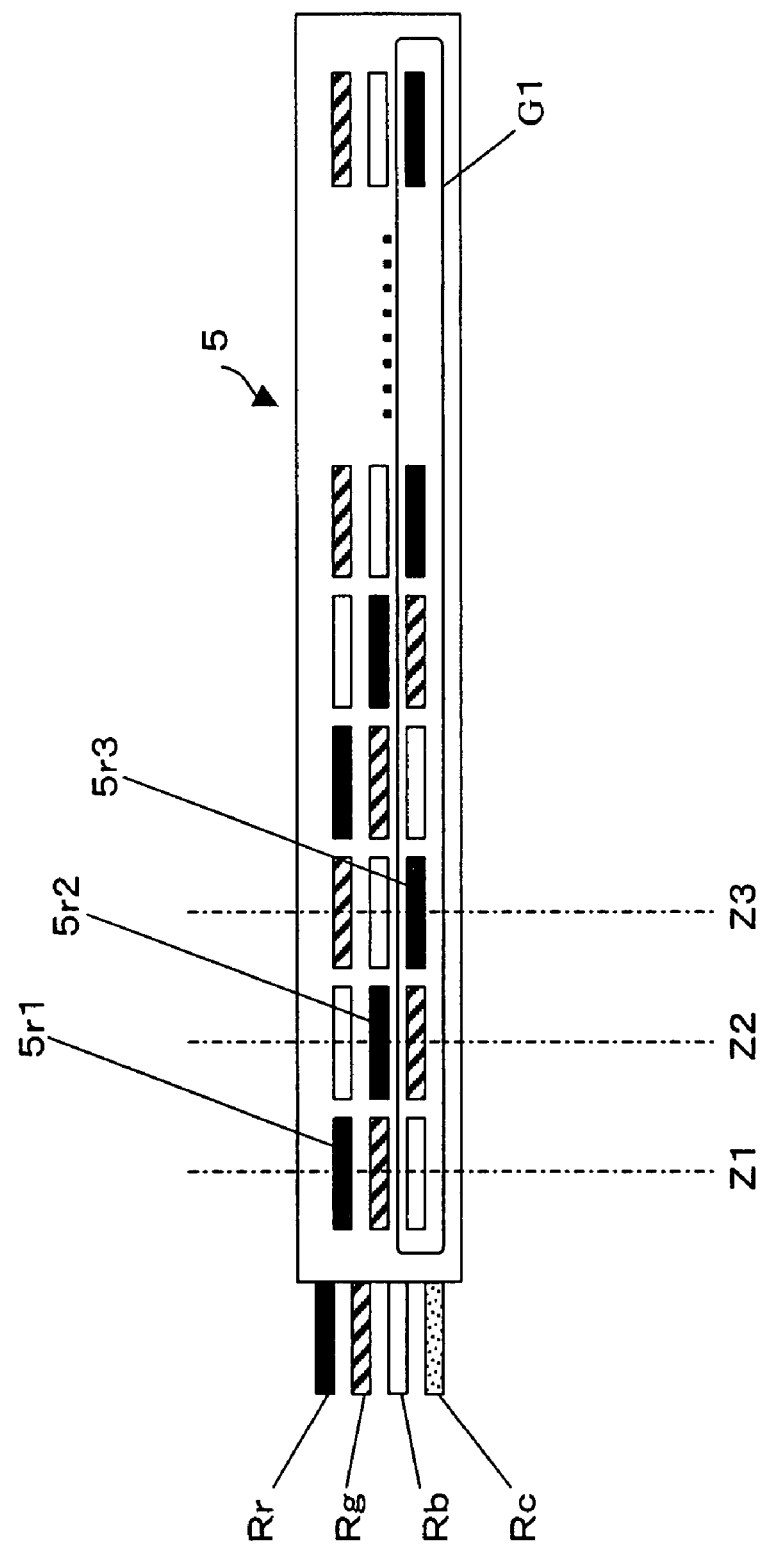
FIG. 6 is a diagram explaining the phases Z1, Z2 and Z3.
Figure 7:
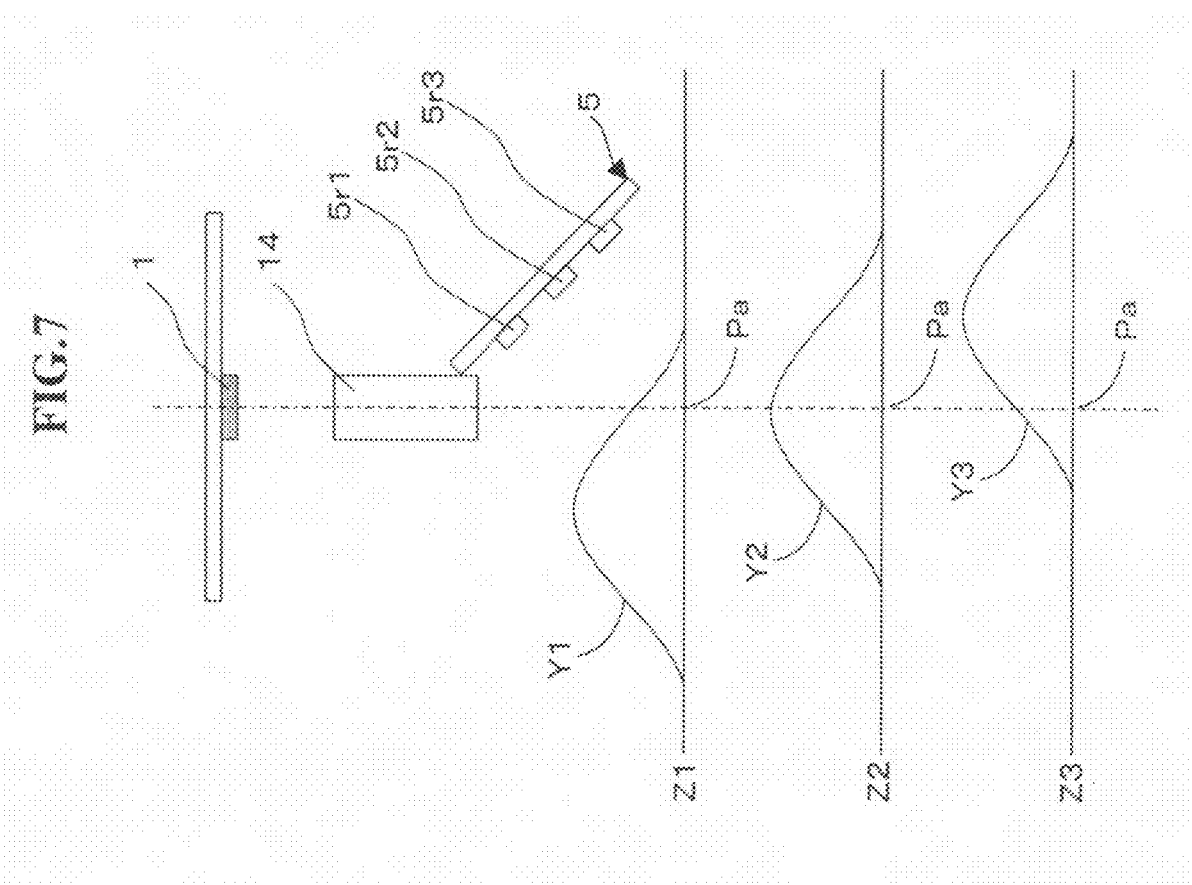
FIG. 7 is a diagram showing the illuminance distribution of the sub scanning direction of the phases Z1, Z2 and Z3.

That is to say, in case of adopting the area light emitting source 5 as shown in FIG. 5A, the illuminance peak point of the sub scanning direction does not appear nearby the reading position. In order to explain about this in detail, FIG. 7 shows the illuminance distribution of the sub scanning direction regarding mutually different phases of the main scanning direction (the phases Z1, Z2, and Z3) shown in FIG. 6.

First, since there is the area light emitter 5r1 in the sub scanning direction of the phase Z1, the illuminance distribution Y1 can be obtained by the light emitted from the area light emitter 5r1. The illuminance peak point of the illuminance distribution Y1 (the illuminance peak point of the sub scanning direction of the phase Z1) appears on the left side of the reading position Pa as illustrated in the drawing.

Additionally, since there is the area light emitter 5r2 in the sub scanning direction of the phase Z2, the illuminance distribution Y2 can be obtained by the light emitted from the area light emitter 5r2. The illuminance peak point of the illuminance distribution Y2 (the illuminance peak point of the sub scanning direction of the phase Z2) is in accord with the reading position Pa as illustrated in the drawing.

Moreover, since there is the area light emitter 5r3 in the sub scanning direction of the phase Z3, the illuminance distribution Y3 can be obtained by the light emitted from the area light emitter 5r3. The illuminance peak point of the illuminance distribution Y3 (the illuminance peak point of the sub scanning direction of the phase Z3) appears on the right side of the reading position Pa as illustrated in the drawing.

On the contrary, in case of adopting the area light emitting source 5 as shown in FIG. 5B, the illuminance peak point of the sub scanning direction appears nearby the reading position. In order to explain in detail about this, FIG. 9 shows the illuminance distribution of the sub scanning direction regarding mutually different phases of the main scanning direction (the phases Z4 and Z5) shown in FIG. 8.

First, since there is the area light emitters 5r1 and 5r2 in the sub scanning direction of the phase Z4, the illuminance distribution Y1 and Y2 can be obtained by the light emitted from the area light emitters 5r1 and 5r2. The illuminance peak point of the illuminance distribution Y1 appears on the left side of the reading position Pa as illustrated in the drawing, but the illuminance peak position of the illuminance distribution Y2 is in accord with the reading position Pa as illustrated in the drawing.

Therefore, the illuminance peak point of the illuminance distribution combining the illuminance distribution Y1 and Y2 (the illuminance peak point of the sub scanning direction of the phase Z4) appears to a little left side of the reading position Pa.

Additionally, since there is the area light emitter 5r2 and 5r3 in the sub scanning direction of the phase Z5, the illuminance distribution Y2 and Y3 can be obtained by the light emitted from the area light emitter 5r2 and 5r3. The illuminance peak point of the illuminance distribution Y3 appears on the right side of the reading position Pa as illustrated in the drawing but the illuminance peak point of the illuminance distribution Y2 is in accord with the reading position Pa as illustrated in the drawing.

Therefore, the illuminance peak point of the illuminance distribution combining the illuminance distribution Y2 and Y3 (the illuminance peak point of the sub scanning direction of the phase Z5) appears to a little right side of the reading position Pa.

In case of adopting the area light emitting source 5 shown in FIG. 5B, the phenomenon that the illuminance peak point of the sub scanning direction appears nearby the reading position can be obtained not only in the above phases Z4 and Z5 of the main scanning direction but also in the other respective phases of the main scanning direction.

Accordingly, in case of adopting the area light emitting source 5 shown in FIG. 5B, the illuminance dispersion 61 when the original is not lifted is little or nothing in characteristics as much as the illuminance dispersion 62 when the original is lifted indicates, as shown in FIG. 10B.

On the contrary, in case of adopting the area light emitting source 5 shown in FIG. 5A, the illuminance dispersion 61 when the original is not lifted is quite different in characteristic from the illuminance dispersion 62 when the original is lifted, as shown in FIG. 10A.

In the meantime, the correction to uniform the illuminance dispersion of images outputted from the sensor 1 in the main scanning direction is called the "shading correction". That is to say, by specifying the illuminance dispersion of the main scanning direction by reading the blank paper at the beginning, and then the shading correction of images is performed considering this illuminance dispersion, thereby it is possible to obtain images without the illuminance dispersion.

As described above, in case of adopting the area light emitting source 5 shown in FIG. 5B, the characteristics of the illuminance dispersion change little or nothing regardless of when the original is lifted and when the original is not lifted. Accordingly, in this case, the shading correction can be performed because the illumination dispersion specified at the beginning is valid without change. Therefore, where the flatbed type (which will be described later) is adopted as the image reading method, it is valid to adopt the area light emitting source 5 shown in FIG. 5B so as to perform the shading correction effectively.

On the contrary, in case of adopting the area light emitting source 5 shown in FIG. 5A, the characteristics of the illuminance dispersion absolutely change when the original is lifted and when the original is not lifted. Accordingly, in this case, the shading correction cannot be performed because the illumination dispersion specified at the beginning is not valid. Therefore, where the sheetfeed type (which will be described later) is adopted as the image reading method, it is valid to adopt the area light emitting source 5 shown in FIG. 5A so as to uniform the illuminance distribution of the main scanning direction.

As described above, according to the image reading method, it is preferable to alternatively adopt either the area light emitting source 5 shown in FIG. 5A or the area light emitting source 5 shown in FIG. 5B. It is needless to say that the area light emitting source 5 shown in FIG. 5B may be adopted together with the sheetfeed type; otherwise, the area light emitting source 5 shown in FIG. 5A may be adopted together with the flatbed type.

Besides, the sheetfeed type is the method of reading images illustrated on the original surface by moving the original to the image sensor head side with a roller. In case of adopting this method, it is not necessary to consider whether the original is lifted or not.

On the other hand, the flatbed type is the method of reading images illustrated on the original surface when the image sensor head moves under the glass plate on which the original is fixed. In case of adopting this type, there is a merit that it is possible to handle the thick original like a book or a magazine, but it is necessary to consider whether the original is lifted or not.

Embodiment 3

This embodiment is explained hereinafter regarding the point different from embodiment 2.

Figure 11:
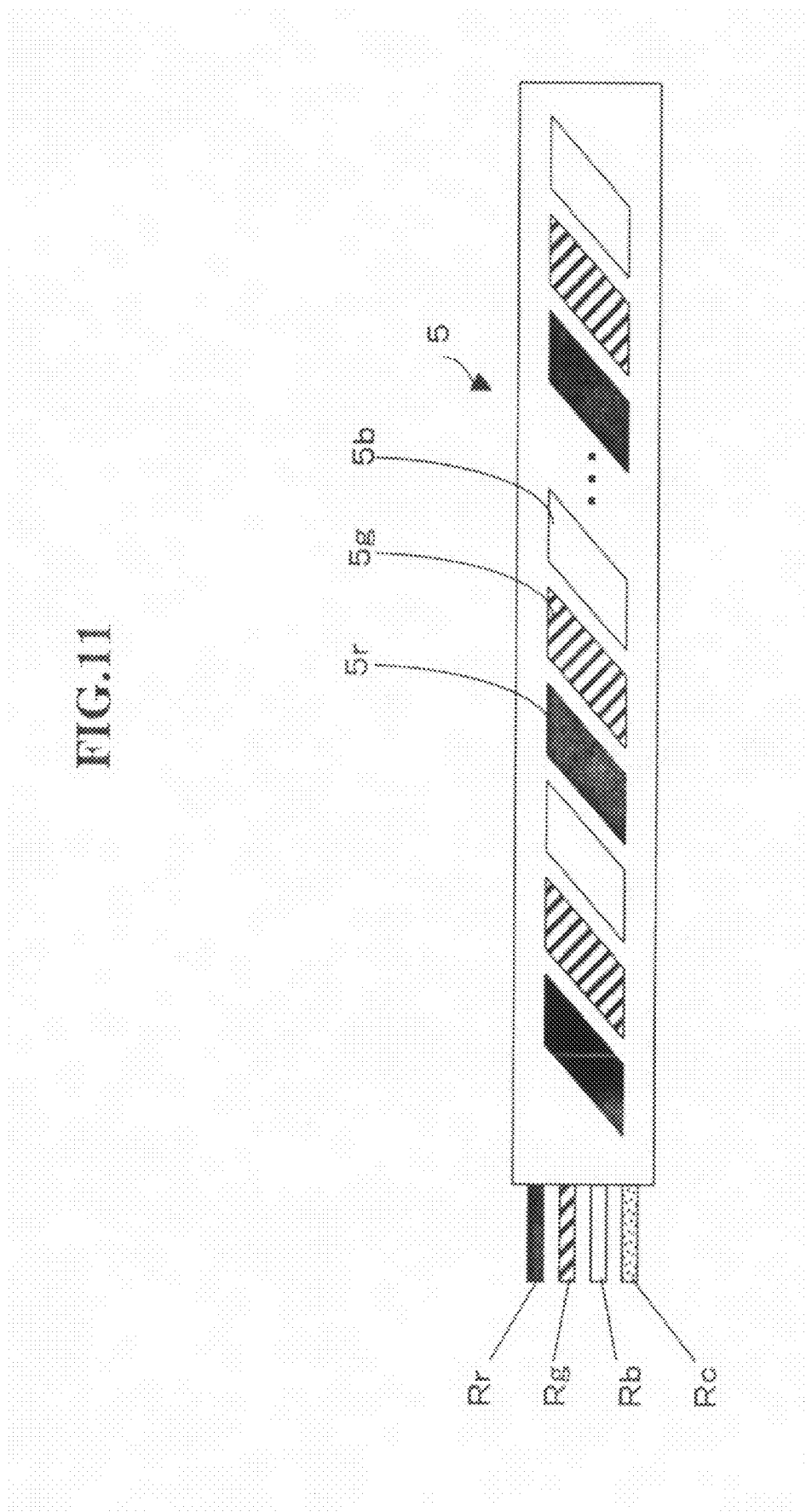
FIG. 11 is a block diagram of the color area light emitting source to which the invention is applied.

In this embodiment, as shown in FIG. 11, the area light emitter 5r, 5g and 5b in the same width and length corresponding to each RGB color are formed in a shape of parallelogram, which is arranged repeatedly in the main scanning direction.

Figure 12:
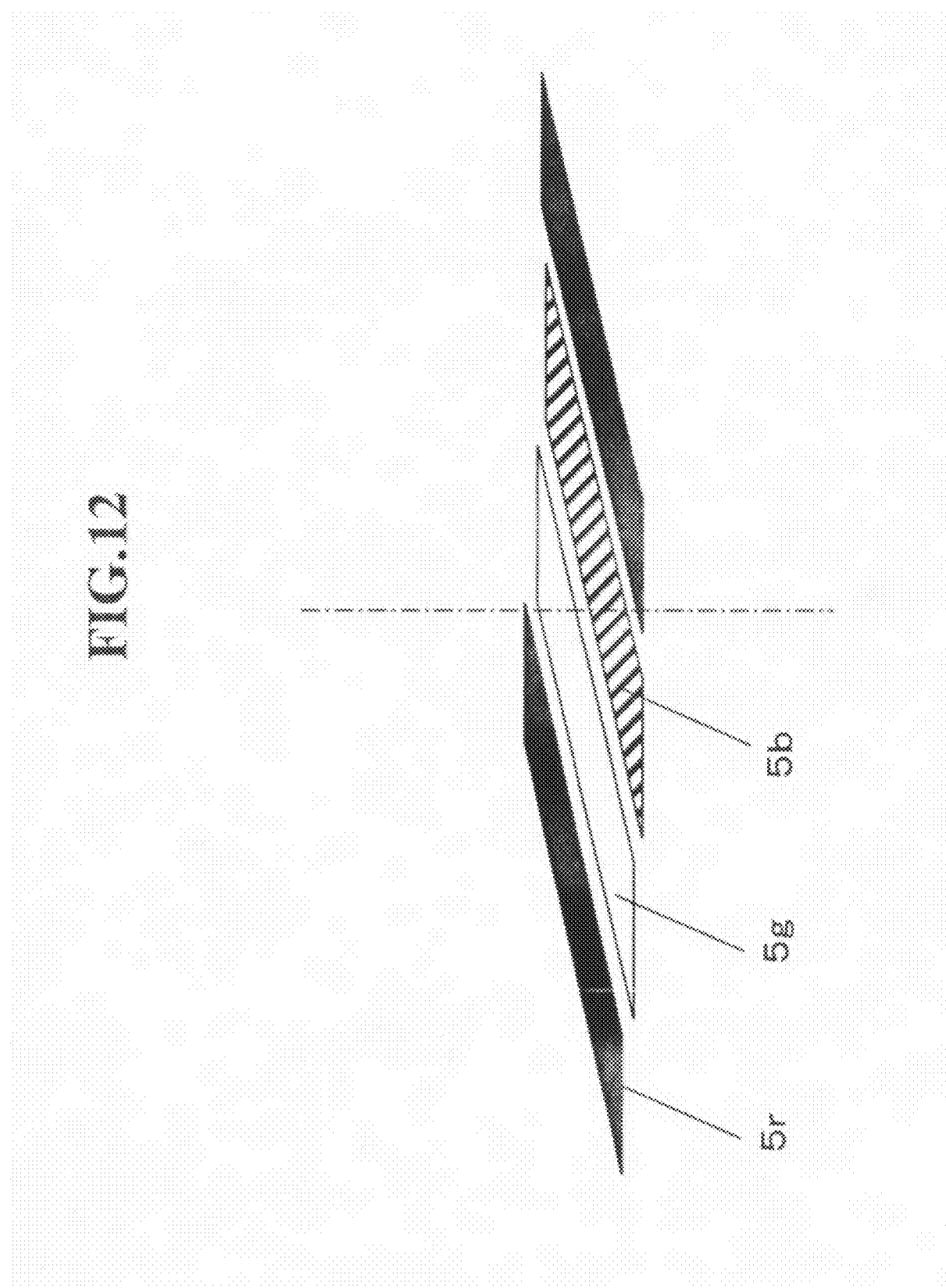
FIG. 12 is a diagram showing that the adjoining area light emitters of the same color overlap each other in the sub scanning direction.

Even if the configuration is arranged as above, it can be found that it is possible to carry out the illuminance dispersion within 10% where adjoining area light emitters of the same color (a red area light emitter 5r, in this embodiment) are arranged so as to overlap each other in the sub scanning direction as shown in FIG. 12.

Figure 13:
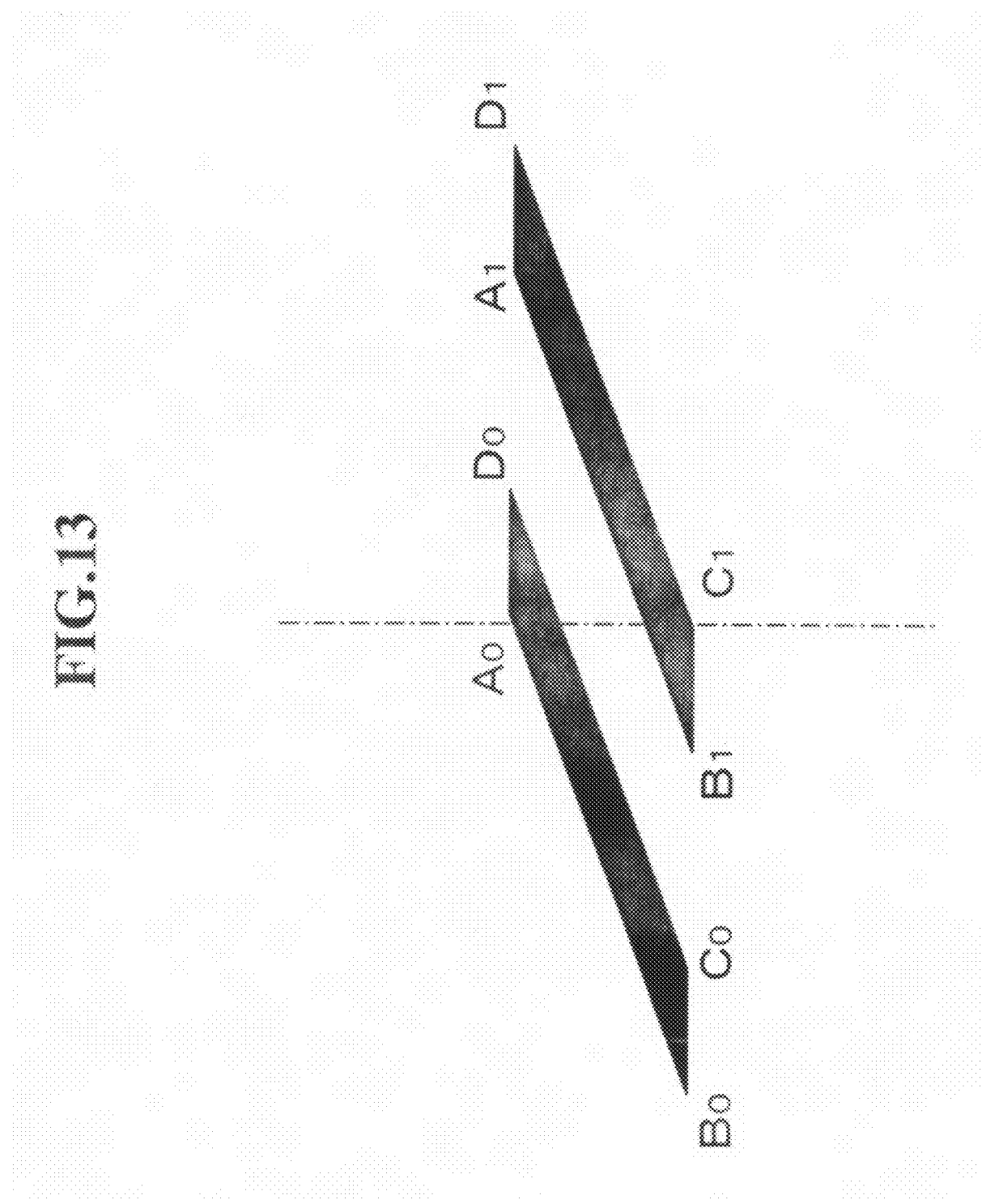
FIG. 13 is a diagram showing that the adjoining area light emitters of the same color overlap each other in the sub scanning direction.

In particular, as shown in FIG. 13, in case where a vertex $A_0$ on the upper left of an area light emitter is on the right side of the vertex $C_1$ on the lower right of the adjoining area light emitter of the same color, it is found that the illuminance dispersion can be carried out within 5%.

As described above, even if it is arranged that the area light emitters 5r, 5g and 5b in the same width length corresponding to each RGB are formed in a shape of parallelogram, which is arranged repeatedly in the main scanning direction. And thereby it is possible to obtain the same effect as in embodiment 2.

Embodiment 4

In the meantime, in order to carry out the objective focal depth D, clear images must be obtained even when the original is lifted. And in order to obtain clear images even when the original is lifted, the illuminance distribution of the sub scanning direction must be formed in a shape of trapezoid as described hereinafter.

Figure 14:
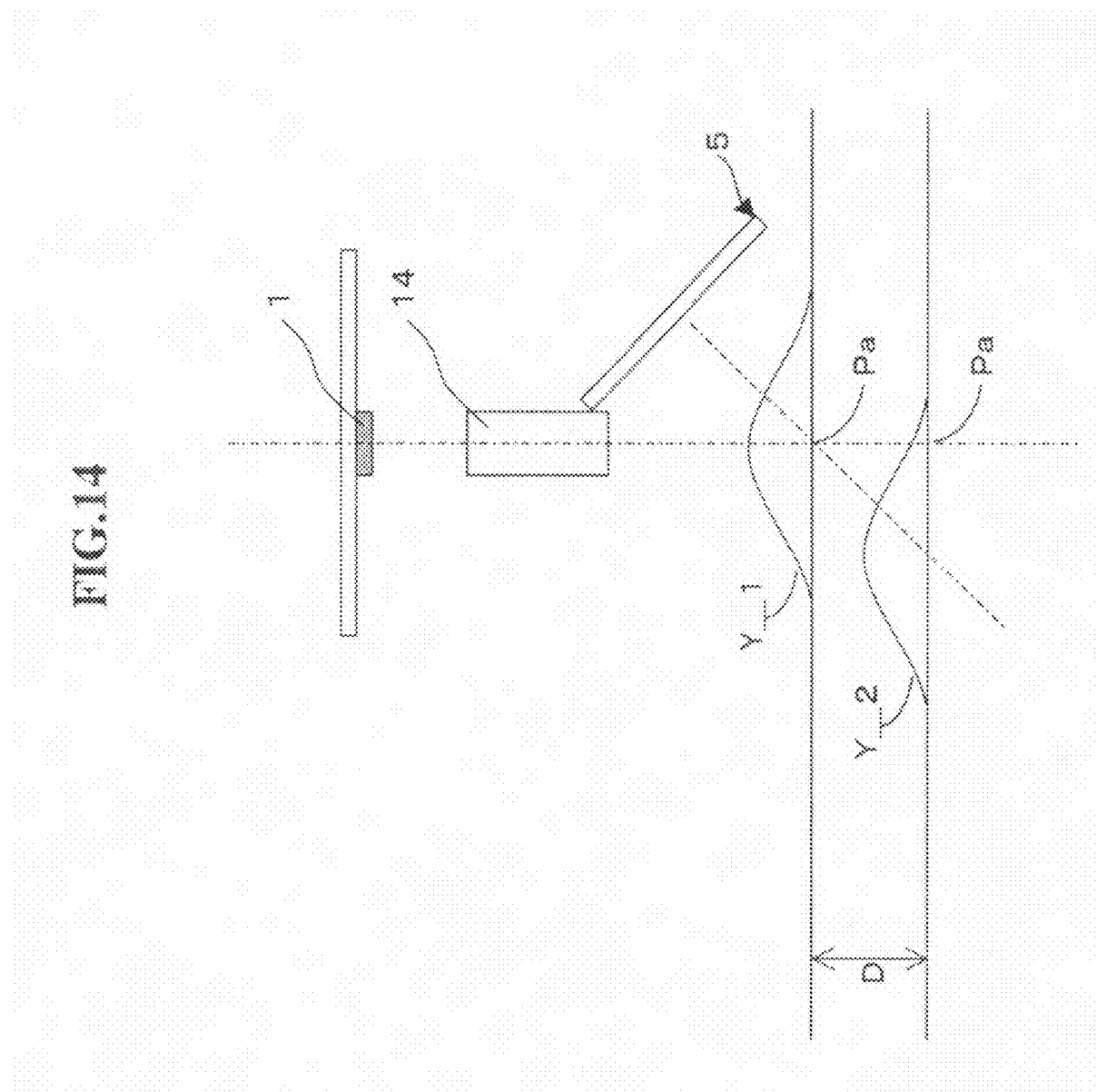
FIG. 14 is a diagram for explaining the parabolic illuminance distribution.

Specifically, FIG. 14 shows the parabolic illuminance distribution Y_2 obtained when the original is lifted (in case where the original is distorted downward as illustrated in the drawing) and the parabolic illuminance distribution Y_1 obtained when the original is not lifted (in case where the original is contacting to the glass plate). As illustrated in this drawing, where the illuminance distribution of the sub scanning direction is formed in a parabolic shape, the illuminance at the reading position Pa gets lower if the original is lifted. Therefore, it is not possible to obtain clear images.

Figure 17:
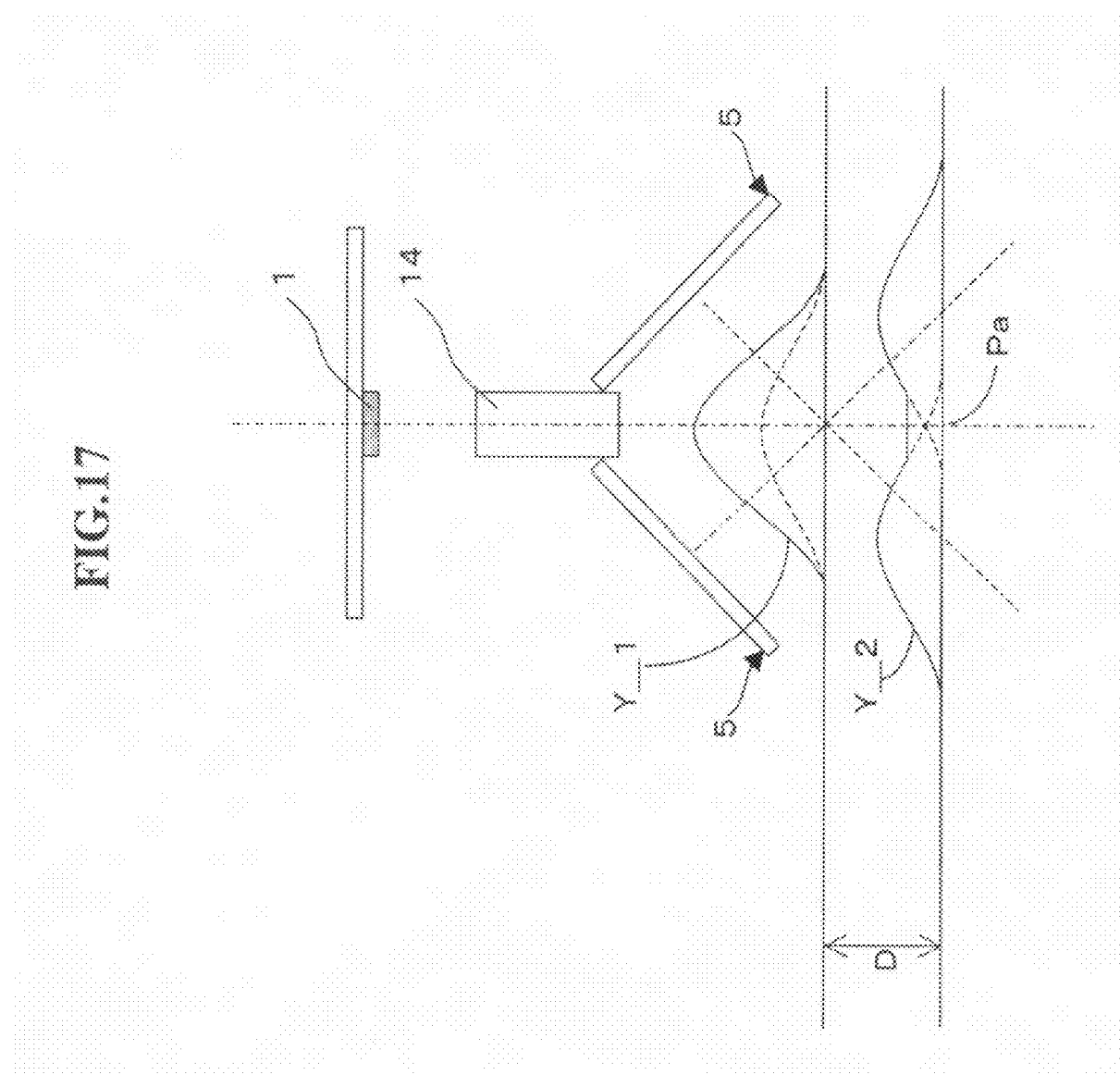
FIG. 17 is a diagram for explaining the illuminance distribution obtained by two area light emitting sources.

For convenience of the explanation, here is described in this embodiment regarding the illuminance distribution obtained by one area light emitting source 5, however, the same is the case with the illuminance distribution obtained by two area light emitting sources 5. That is to say, under the configuration provided with two area light emitting sources 5, that respective illuminance distributions obtained by each area light emitting source 5 would be combined simply together as shown in FIG. 17.

Figure 15:
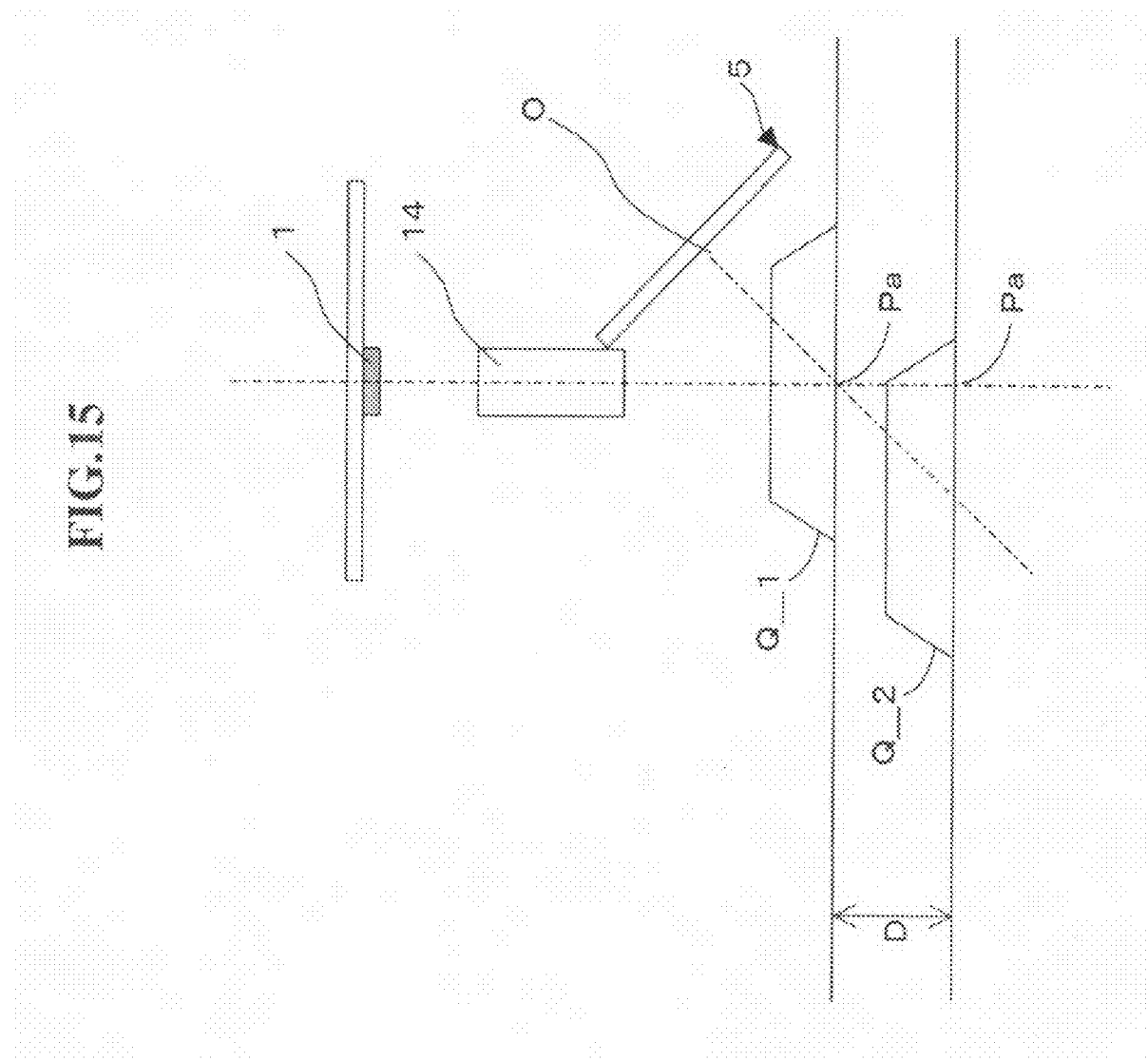
FIG. 15 is a diagram for explaining the trapezoidal illuminance distribution.

As contrasted to the above, FIG. 15 shows the trapezoidal illuminance distribution Q_2 obtained when the original is lifted and the trapezoidal illuminance distribution Q_1 obtained when the original is not lifted (that is to say, in case where the original is contacting to the glass plate). As shown in this drawing, where the illuminance distribution of the sub scanning direction is formed in a trapezoidal shape, the illuminance at the reading position Pa will not get lower even when the original is lifted, therefore, it is possible to obtain clear images.

In order to form the illuminance distribution of the sub scanning direction in the trapezoidal shape, there is a simple way to extend the width of the light emitting element in the sub scanning direction. However, extending the width of the light emitting element incurs the large scaled apparatus in addition to the increase of the cost.

Therefore, the invention of this embodiment adopts the following method.

Figure 16:
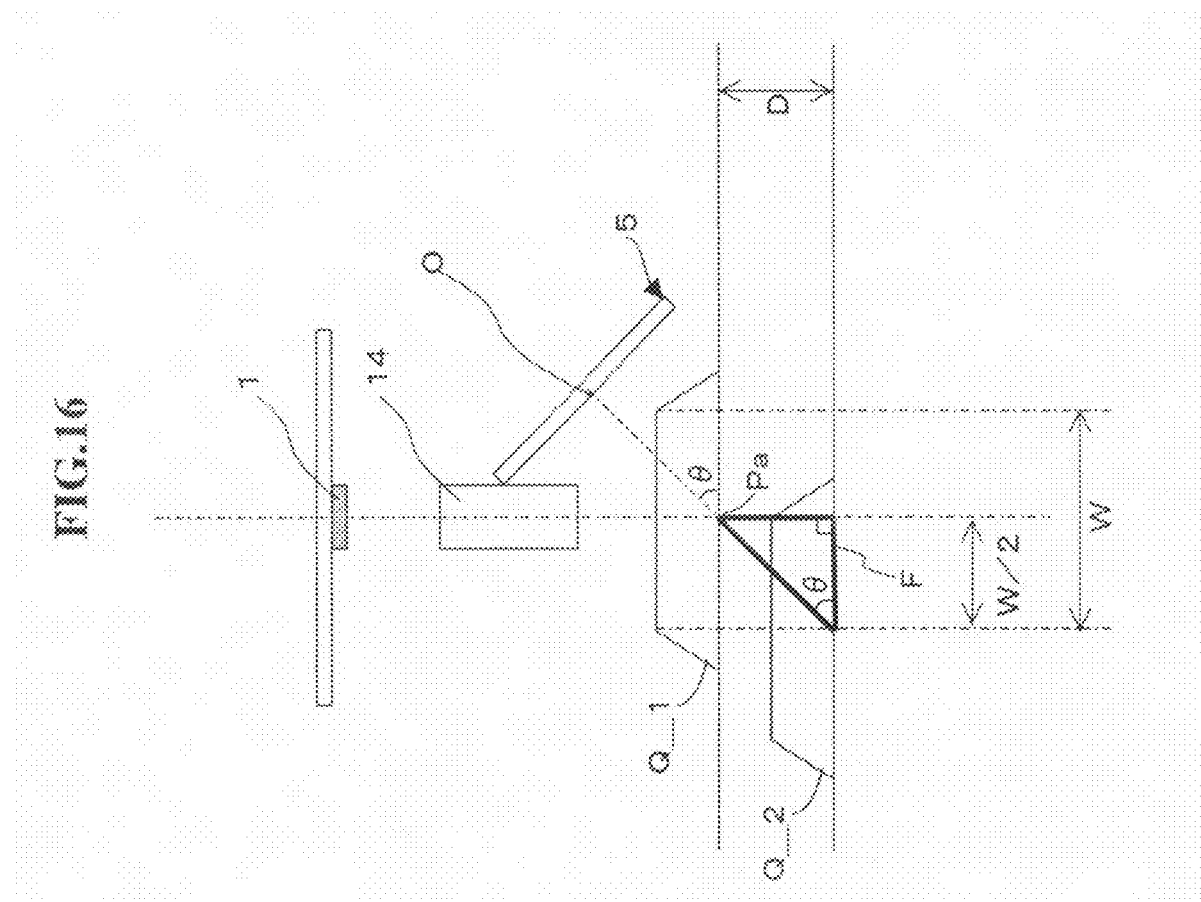
FIG. 16 is a diagram for explaining the length of the upper side.

FIG. 16 shows the trapezoidal illuminance distribution Q_2 obtained when the original is lifted, and the trapezoidal illuminance distribution Q_1 obtained when the original is not lifted.

Here, it is predetermined that the upper side length W of the trapezoidal illuminance distribution in the sub scanning direction be a value not less than the one found by the following equation. Besides, "θ" indicated by this equation is the angle formed by a segment joining a center O of the area light emitting source 5 and the reading position Pa and the original surface.

$$W = 2D/\tan\theta \qquad \text{Equation 1}$$

The equation can be derived in ease by giving attention to a right triangle F indicated by a thick line illustrated in FIG. 16. That is to say, where the base length of the right triangle F is W/2 and the height is D, $\tan\theta = D/(W/2)$, and then the equation 1 can be found.

As mentioned above, in case where the upper side length W is $2D/\tan\theta$ and more, the illuminance of the reading position when the original is lifted is equal to that when the original is not lifted. Consequently, the width of the light emitting element should be extended so that the upper side length W will be $2D/\tan\theta$ and more. However, as explained previously, extending the width of the light emitting element causes various inconveniences, therefore, it is arranged in the invention that the upper side W be optimized.

Though the details will be explained later, the angle θ is preferable to be limited within the range from 40° through 55°. Accordingly, it is arranged in the invention that the width of the light emitting element be determined so that the upper side length W will suffice the conditions of the following equation. Thereby, it is possible to obtain clear images even when the original is lifted with keeping the various troubles to a minimum.

$$2D/\tan 55° \leq W \leq 2D/\tan 40° \qquad \text{Equation 2}$$

It is arranged here that the width of the light emitting element should be changed in order to optimize the upper side length W, but this invention is not limited to this. For instance, since the value of the upper side length W also is varied according to the distance between the center of the light source and the reading position, the upper side length W may be optimized by changing this distance.

Besides, in the general type of the copying machine, the focal depth D requires approximately 2 mm. In case where the invention is applied to such copying machine, the angle θ is set to 40°, and the distance between the center of the light source and the reading position is set to 3 mm. At this time, it is found that the upper side length W requires about 4 mm. In addition, in order to carry out this value of the upper side length W, it is found that the light emitting element requires 3 mm in width.

The following describes about the ground that the angle θ is limited within the range from 40° through 55°.

As will be described hereunder, while varying the position and angle of the area light emitting source, the illuminance of the original surface and the MTF (Modulation transfer function) value are measured in each case and the measurement results are evaluated. The term "MTF value" as used herein means the resolving power of the sensor.

Figure 18:
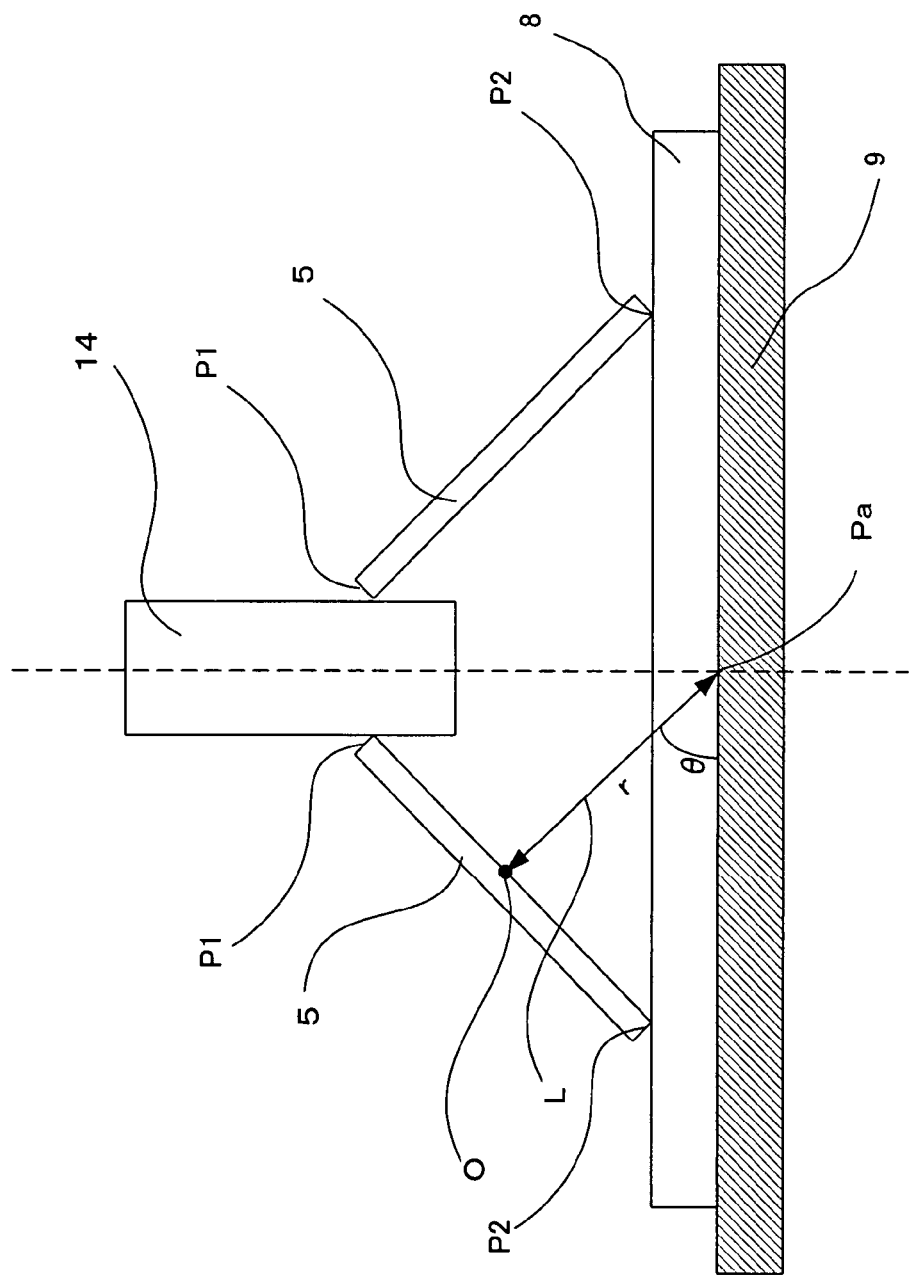
FIG. 18 is a layout and explanatory diagram of area light emitting sources.

First, two monochrome area light emitting sources, each 160 mm in length and 4 mm in width, are joined in the longitudinal direction (the main scanning direction) into the A3 size area light emitting source, and two "A3 size" area light emitting source 5 are provided on both sides of the lens 14 respectively as shown in FIG. 18. And the angle θ formed by the segment L and the reading position Pa are varied from 20° to 70° as set the length r of the segment L joining the center O of the area light emitter 5 to the reading position Pa to 5 mm. At this time, the illuminance of the original surface and the MFT value are measured.

Figure 19A:
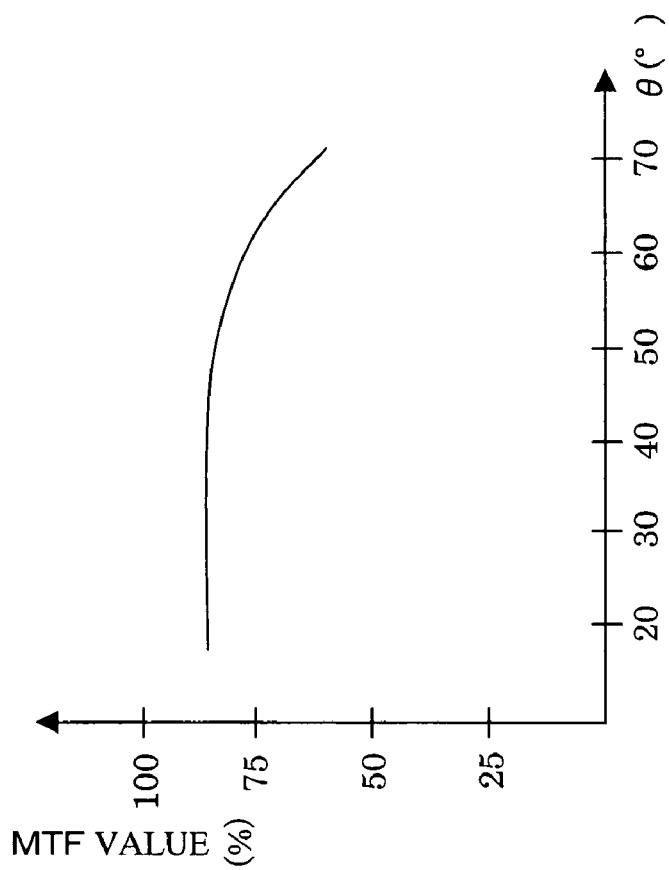
FIGS. 19A and 19B are diagrams showing the measurement result of the original surface illuminance and the MTF value.
Figure 19B:
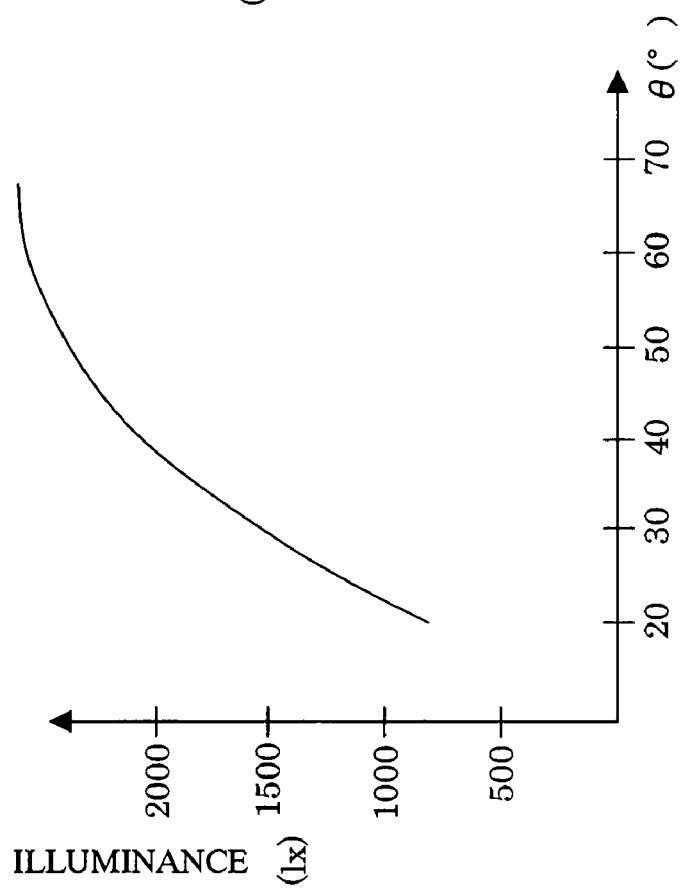

The results show that the original surface illuminance not less than 1,600 lx can be obtained in case where the angle θ is 30° and more as shown in FIG. 19A, while the MTF value not less than 75% can be obtained in case where the angle θ is 60° and more as shown in FIG. 19B. That is, it is preferable that the angle θ be from 30° through 60°.

It is also found that the original surface illuminance not less than 2,000 lx can be obtained in case where the angle θ is 40° and more as shown in FIG. 19A, while the MTF value not less than 80% can be obtained in case where the angle θ is 55° and more as shown in FIG. 19B. That is, it is especially preferable that the angle be from 40° through 55°.

The above is the ground that the angle θ is limited within the range from 40° through 55°.

Besides, the monochrome area light emitting source is taken as an example in this embodiment, however, the same effect can be also obtained in case of adopting the color area light emitting source. It is arranged in the invention that the area light emitting source 4 mm in width is adopted and the length r of the segment L is fixed as 5 mm, in addition, even in case where the measurement is carried out under the other conditions, it is found that the preferable angle θ is within the range from 30° through 60°, and more specifically, that the most preferable angle θ is within the range from 40° through 55°.

Embodiment 5

Figure 20:
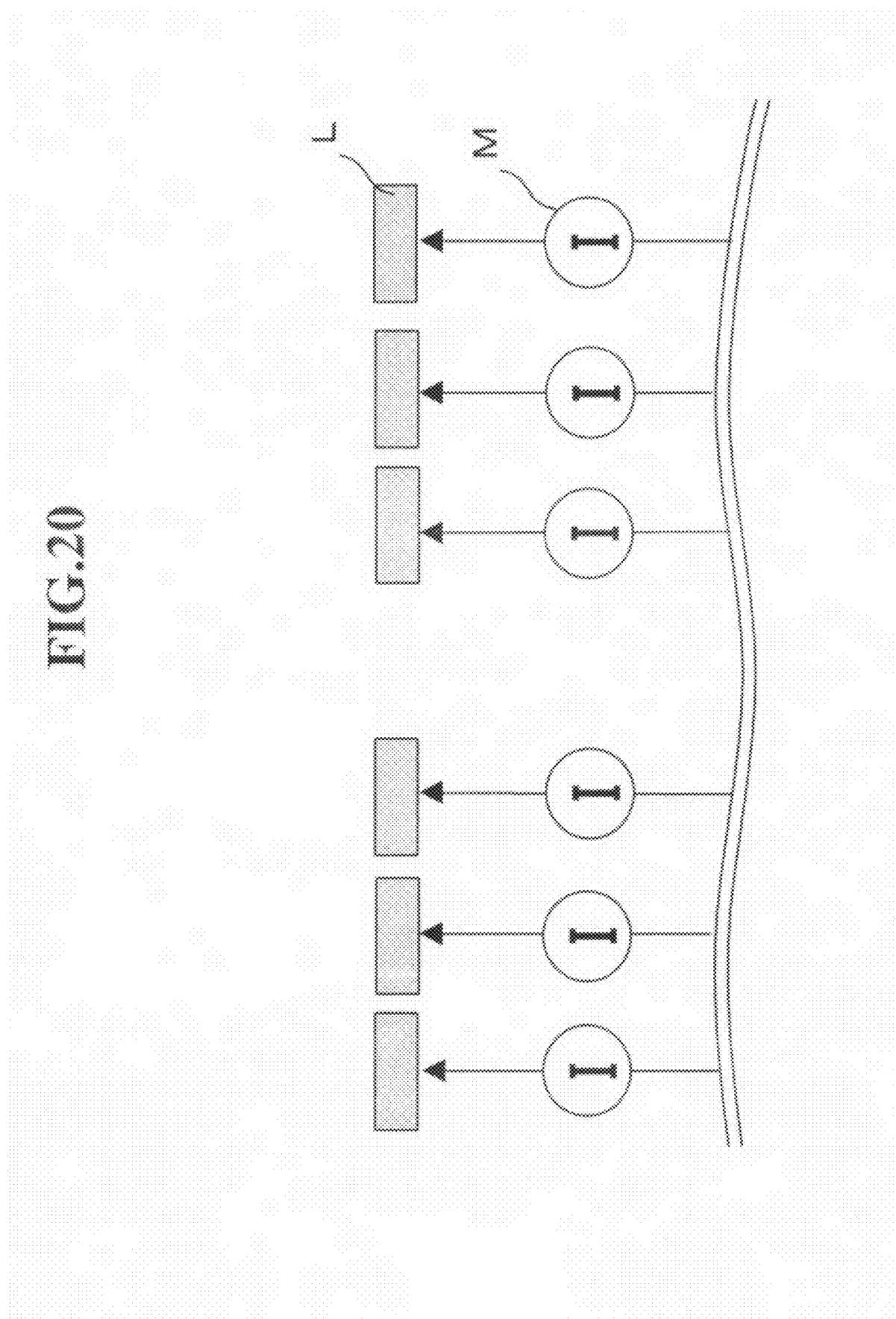
FIG. 20 is a diagram showing the configuration for driving the light emitting element.
Figure 22:
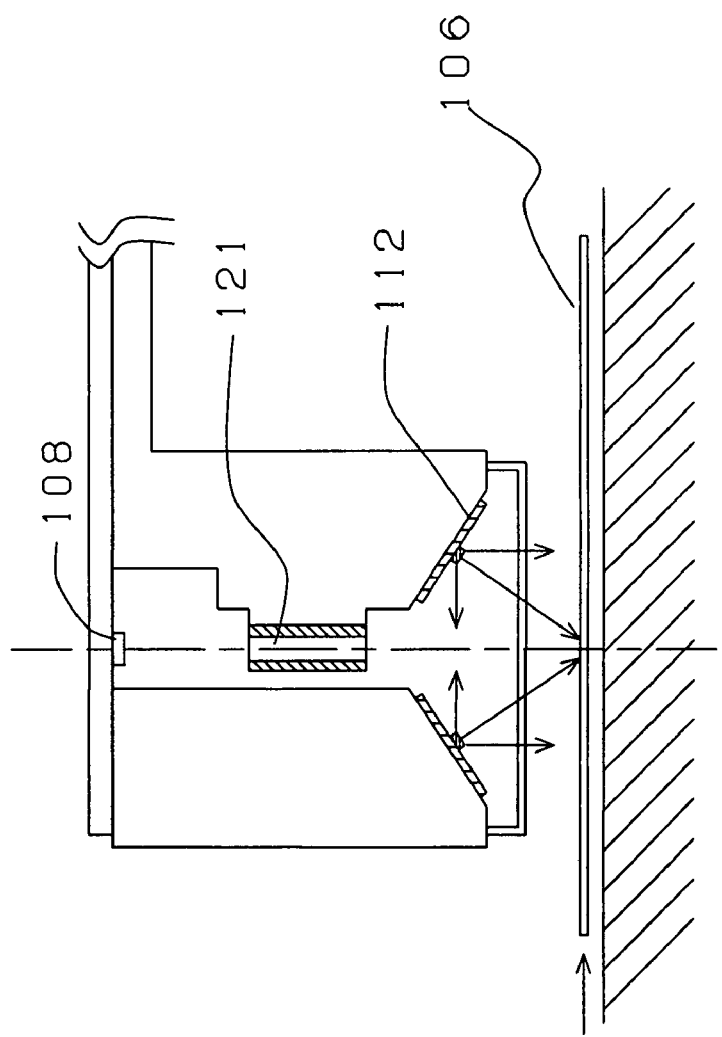
FIG. 22 is a block diagram of the conventional image reading apparatus.
Figure 23:
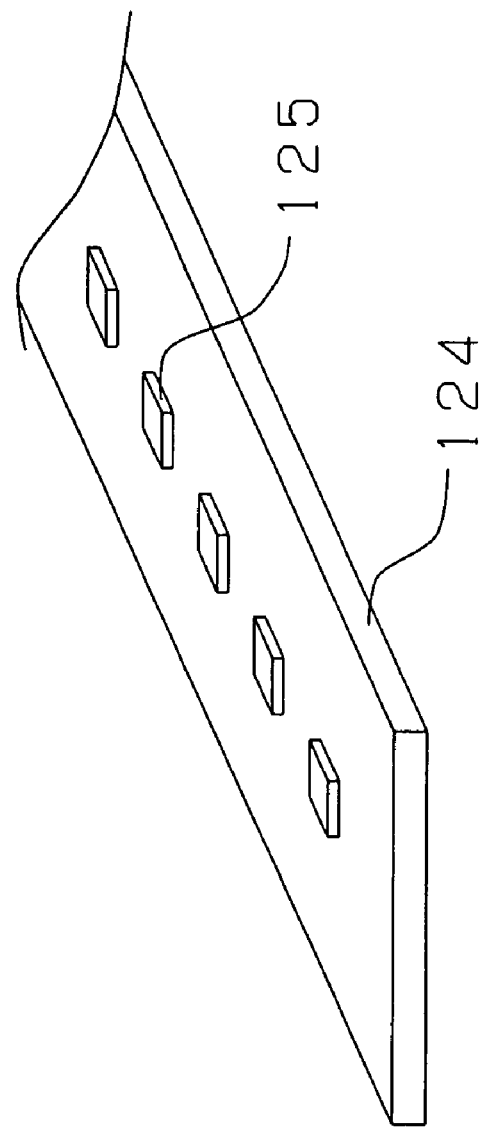
FIG. 23 is a perspective view of the light source with which the conventional image reading apparatus is provided.
Figure 24:
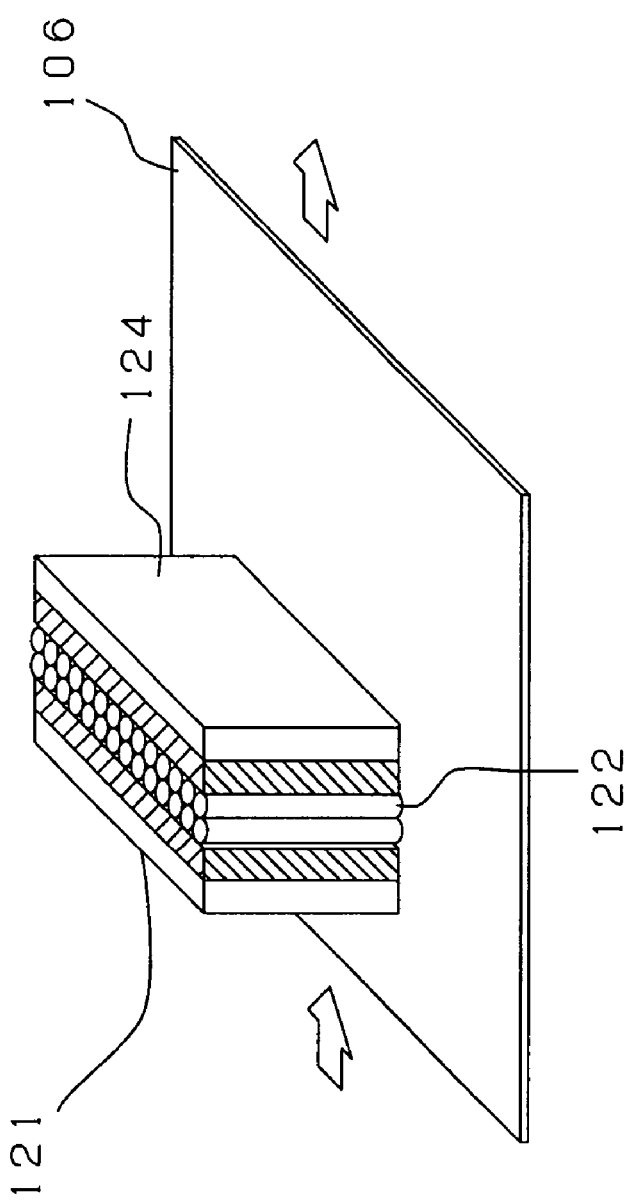
FIG. 24 is a perspective view of the rod lens array with which the conventional image reading apparatus is provided.
Figure 25:
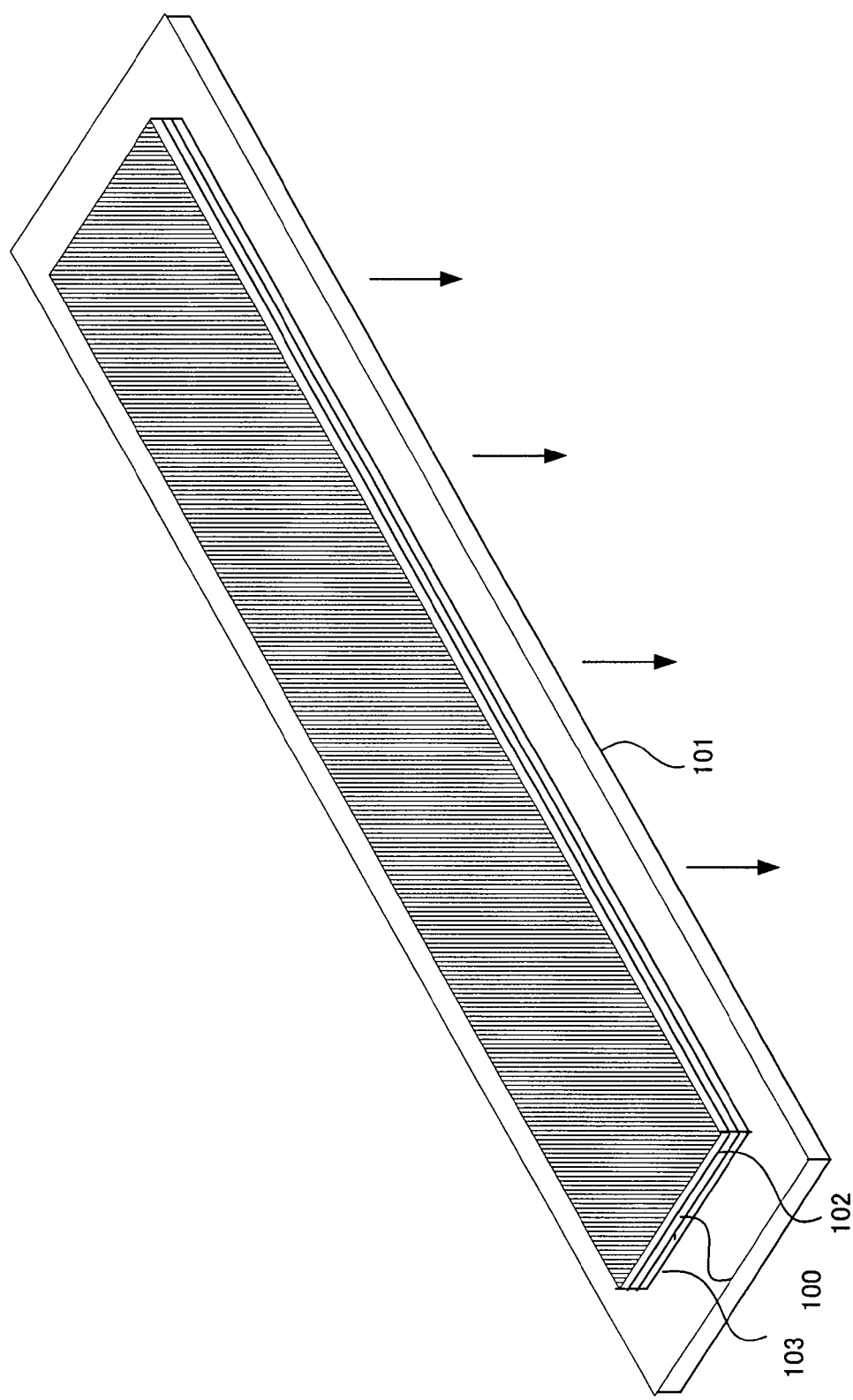
FIG. 25 is a perspective view of the monochrome area light emitting source using the electro luminescence film.
Figure 26:
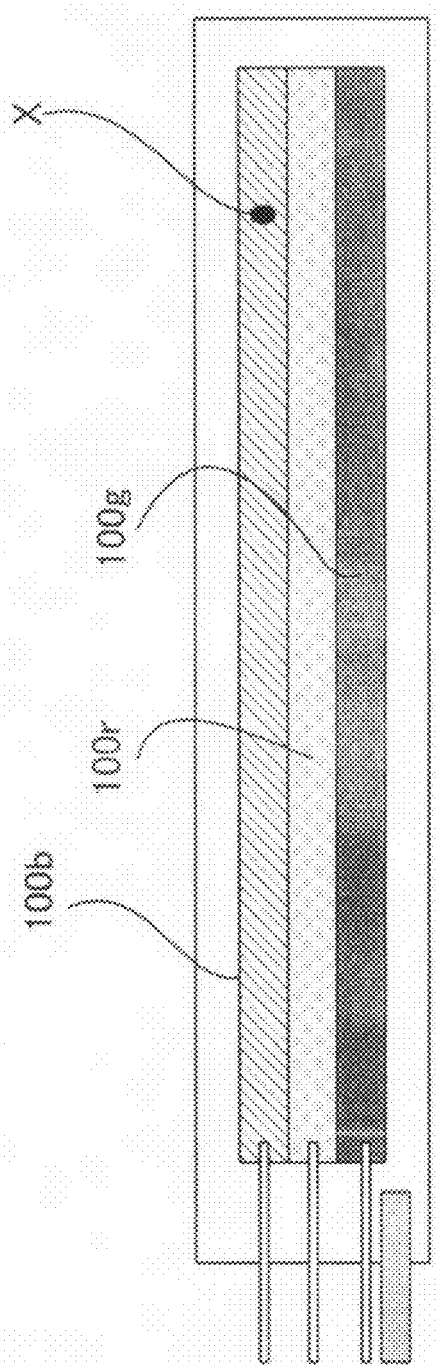
FIG. 26 is a perspective view of the color area light emitting source using the electro luminescence film.

In the meantime, a simple method of driving the light emitting element is to drive each light emitting element L by respective constant current sources M as shown in FIG. 20. However, the cost increases because of such configuration. In other words, if considering the cost, it is preferable that the apparatus be configured so as to drive plural light emitting elements by one constant current source.

However, if easily adopting the configuration that the plural light emitting elements are driven by one constant current source, it fails to extend the life of the light source. Where any point of a light emitting element has a defect like the film thickness is thin, the current to flow to other light emitting elements will gather at this point of the defective light emitting element and then the film burns out from this point.

Therefore, the invention is arranged so as to drive the light emitting element according to the following configuration in order not to disturb the effect of extending the life and not to incur the increase of the cost.

That is to say, as shown in FIG. 21A, plural light emitting elements L are connected electrically with one constant current source M through respective resistive elements N. The resistance value of the resistive element N is not restricted in particular, but may be far larger than that of the light emitting element L.

According such configuration, even when somewhere of the light emitting element has a defect like the film thickness is thin, this does not exert any influence on the sum of the resistance value of the resistive elements and the light emitting elements, thereby, the current to flow to other light emitting elements does not gather at this point of the defective light emitting element.

Otherwise, as shown in FIG. 21B, plural resistive elements N are connected with plural light emitting elements L, of which respective both ends are connected with a constant voltage source O to impress a specific voltage. Under such configuration, where the resistance value of the resistive element N is predetermined to be far larger than that of the light emitting element L, it is possible to obtain the same effect as above.

As described above, the invention is arranged so as to drive the light emitting element under the configuration that does not disturb the effect of extending the life and does not incur the increase of the cost.

Besides, the invention of this embodiment is described only as plural light emitting elements are connected with one constant current source; however, the number of light emitting elements to be connected with the one constant current source is not limited in particular. That is to say, it may be arranged that all of the light emitting elements be connected with one constant current source, otherwise, a unit of light emitting elements corresponding to each color of RGB color may be connected with one constant current source. Moreover, each area light-emitter column G shown in FIG. 1 or each area light emitter row G1 shown in FIG. 5 may be connected with one constant current source. And it is needless to say that the same is true of the number of light emitting elements to be connected with the one constant voltage source.

In the above description, the light source of the image reading apparatus is taken as an example; however, the invention can be utilized for the light source of the print head or any type of the apparatus involving the area light emitting source.

In the invention as described above, even when somewhere of the light emitting element has a defect like film thickness is thin, the current gathering at this point with the low resistance value becomes a very small volume. Therefore, it would not occur that the film burns out from here, and in result it is possible to extend the life span of the light source of the image reading apparatus.

In addition, the invention is arranged that a plurality of area light emitter rows formed by arranging the area light emitters corresponding to each RGB color in the main scanning direction is arranged in the sub scanning direction so that each phase of the main scanning direction will be different each other, and in result, it is possible to uniform the illuminance distribution of the main scanning direction.

Furthermore, in the invention, even when somewhere in the light emitting element has a defect like the film thickness is thin, this does not exert any influence upon the sum of the resistance values of the resistive elements and the light emitting elements, thereby the current to flow to the other light emitting elements does not gather on the defective light emitting element. In other words, it is possible to drive the light emitting element under the configuration that does not incur the increase of the cost and does not disturb the effect that the life of the light source can be extended.

What is claimed is:

1. A driving device of a light source including a light emitting area made up of a transparent electrode film, an electroluminescence film, and a metal electrode, the driving device comprising:
   a plurality of light emitting elements for forming the light emitting area;
   resistors connected in serial with the light emitting elements respectively; and
   a constant current source permitting the same current to flow to each unit of the light emitting element and the resistor,
   wherein rows and columns of plural light emitting elements form the light emitting area; a light emitting element row on which light emitting elements for a same color are arranged in a main scanning direction; and a light emitting element column on which the light emitting elements for red, green, and blue are arranged in a sub scanning direction.

2. A driving device of a light source including a light emitting area made up of a transparent electrode film, an electroluminescence film, and a metal electrode, the driving device comprising:
   a plurality of light emitting elements for forming the light emitting area;
   resistors connected in serial with the light emitting elements respectively; and
   a constant voltage source impressing a specific voltage on each unit of the light emitting element and the resistor,
   wherein rows and columns of plural light emitting elements form the light emitting area; a light emitting element row on which light emitting elements for a same color are arranged in a main scanning direction; and a light emitting element column on which the light emitting elements for red, green, and blue are arranged in a sub scanning direction.

3. A driving device of a light source according to claim 1, wherein the area of a light emitting element is determined by the correlation between a life of a light source and an aperture ratio.

4. A driving device of a light source according to claim 1, wherein the width of a light emitting element in the sub scanning direction is determined so that the upper side length of the trapezoidal illuminance distribution in the sub scanning direction will be from $2D/\tan \theta$ ($\theta=55°$) through $2D/\tan \theta$ ($\theta=40°$) where an objective focal depth is D and in angle formed by a segment joining a center of the light source to a reading position and an original surface is $\theta$.

5. A driving device of a light source according to claim 1 or 2, wherein rows and columns of plural light emitting elements form the light emitting area; a light emitting element row on which light emitting elements for red, green and blue are arranged sequentially and repeatedly in a main scanning direction, and of which phase is different from an adjacent row; and a light emitting element column on which light emitting elements for a same color are arranged in a sub scanning direction.

6. A driving device of a light source according to claim 5, wherein the phase between the light emitting rows is one length of a light emitting element.

7. A driving device of a light source according to claim 5, wherein the phase between the light emitting rows is a half length of a light emitting element.

8. A driving device of a light source according to claim 5, wherein the area of a light emitting element is determined by the correlation between a life of a light source and an aperture ratio.

9. A driving device of a light source according to claim 5, wherein the width of a light emitting element in the sub scanning direction is determined so that the upper side length the trapezoidal illuminance distribution in the sub scanning direction will be from $2D/\tan \theta$ ($\theta=55°$) through $2D/\tan \theta$ ($\theta=40°$) where an objective focal depth is D and an angle formed by a segment joining a center of light source to a reading position and an original surface is $\theta$.

10. A driving device of a light source according to claim 1 or 2, wherein a light emitting element in a shape of parallelogram forms the light emitting area; and a light emitting element row on which the light emitting elements for red, green, and blue are arranged sequentially and repeatedly in a main scanning direction, wherein the two light emitting elements for a same color overlap in the sub scanning direction.

11. A driving device of a light source according to claim 10, wherein the area of a light emitting element is determined by the correlation between a life of a light source and an aperture ratio.

12. A driving device of a light source according to claim 10, wherein the width of light emitting element in the sub scanning direction is determined so that the upper side length of the trapezoidal illuminance distribution in the sub scanning direction will be from 2D/tan θ (θ=55°) through 2D/tan θ (θ=40°) where an objective focal depth is D and an angle formed by a segment joining a center of the light source to a reading position and an original surface is θ.

13. A driving device of a light source according to claim 2, wherein the area of a light emitting element is determined by the correlation between a life of a light source and an aperture ratio.

14. A driving device of a light source according to claim 2, wherein the width of a light emitting element in the sub scanning direction is determined so that the upper side length of the trapezoidal illuminance distribution in the sub scanning direction will be from 2D/tan θ (θ=55°) through 2D/tan θ (θ=40°) where an objective focal depth is D and in angle formed by a segment joining a center of the light source to a reading position and an original surface is θ.

15. A driving device of a light source including a light emitting area made up of a transparent electrode film, an electroluminescence film, and a metal electrode, the driving device comprising:
   a plurality of light emitting elements for forming the light emitting area;
   resistors connected in serial with the light emitting elements respectively; and
   a constant current source permitting the same current to flow to each unit of the light emitting element and the resistor,
   wherein rows and columns of plural light emitting elements form the light emitting area; a light emitting element row on which light emitting elements for red, green and blue are arranged sequentially and repeatedly in a main scanning direction, and of which phase is different from an adjacent row; and a light emitting element column on which light emitting elements for a same color are arranged in a sub scanning direction.

16. A driving device of a light source according to claim 15, wherein the phase between the light emitting rows is one length of a light emitting element.

17. A driving device of a light source according to claim 15, wherein the phase between the light emitting rows is a half length of a light emitting element.

18. A driving device of a light source according to claim 15, wherein the area of a light emitting element is determined by the correlation between a life of a light source and an aperture ratio.

19. A driving device of a light source according to claim 15, wherein the width of a light emitting element in the sub scanning direction is determined so that the upper side length the trapezoidal illuminance distribution in the sub scanning direction will be from 2D/tan θ (θ=55°) through 2D/tan θ (θ=40°) where an objective focal depth is D and an angle formed by a segment joining a center of light source to a reading position and an original surface is θ.

20. A driving device of a light source including a light emitting area made up of a transparent electrode film, an electroluminescence film, and a metal electrode, the driving device comprising:
   a plurality of light emitting elements for forming the light emitting area;
   resistors connected in serial with the light emitting elements respectively; and
   a constant voltage source impressing a specific voltage on each unit of the light emitting element and the resistor,
   wherein rows and columns of plural light emitting elements form the light emitting area; a light emitting element row on which light emitting elements for red, green and blue are arranged sequentially and repeatedly in a main scanning direction, and of which phase is different from an adjacent row; and a light emitting element column on which light emitting elements for a same color are arranged in a sub scanning direction.

21. A driving device of a light source according to claim 20, wherein the phase between the light emitting rows is one length of a light emitting element.

22. A driving device of a light source according to claim 20, wherein the phase between the light emitting rows is a half length of a light emitting element.

23. A driving device of a light source according to claim 20, wherein the area of a light emitting element is determined by the correlation between a life of a light source and an aperture ratio.

24. A driving device of a light source according to claim 20, wherein the width of a light emitting element in the sub scanning direction is determined so that the upper side length the trapezoidal illuminance distribution in the sub scanning direction will be from 2D/tan θ (θ=55°) through 2D/tan θ (θ=40°) where an objective focal depth is D and an angle formed by a segment joining a center of light source to a reading position and an original surface is θ.

25. A driving device of a light source including a light emitting area made up of a transparent electrode film, an electroluminescence film, and a metal electrode, the driving device comprising:
   a plurality of light emitting elements for forming the light emitting area;
   resistors connected in serial with the light emitting elements respectively; and
   a constant current source permitting the same current to flow to each unit of the light emitting element and the resistor,
   wherein a light emitting element in a shape of parallelogram forms the light emitting area; and a light emitting element row on which the light emitting elements for red, green, and blue are arranged sequentially and repeatedly in a main scanning direction, wherein the two light emitting elements for a same color overlap in the sub scanning direction.

26. A driving device of a light source according to claim 25, wherein the area of a light emitting element is determined by the correlation between a life of a light source and an aperture ratio.

27. A driving device of a light source according to claim 25, wherein the width of light emitting element in the sub scanning direction is determined so that the upper side length of the trapezoidal illuminance distribution in the sub scanning direction will be from 2D/tan θ (θ=55°) through 2D/tan θ (θ=40°) where an objective focal depth is D and an angle formed by a segment joining a center of the light source to a reading position and an original surface is θ.

28. A driving device of a light source including a light emitting area made up of a transparent electrode film, an electroluminescence film, and a metal electrode, the driving device comprising:
   a plurality of light emitting elements for forming the light emitting area;
   resistors connected in serial with the light emitting elements respectively; and
   a constant voltage source impressing a specific voltage on each unit of the light emitting element and the resistor, wherein a light emitting element in a shape of parallelogram forms the light emitting area; and a light emitting element row on which the light emitting elements for red, green, and blue are arranged sequentially and repeatedly in a main scanning direction, wherein the two light emitting elements for a same color overlap in the sub scanning direction.

29. A driving device of a light source according to claim 28, wherein the area of a light emitting element is determined by the correlation between a life of a light source and an aperture ratio.

30. A driving device of a light source according to claim 28, wherein the width of light emitting element in the sub scanning direction is determined so that the upper side length of the trapezoidal illuminance distribution in the sub scanning direction will be from 2D/tan $\theta$ ($\theta=55°$) through 2D/tan $\theta$ ($\theta=40°$) where an objective focal depth is D and an angle formed by a segment joining a center of the light source to a reading position and an original surface is $\theta$.

* * * * *

UNITED STATES PATENT AND TRADEMARK OFFICE
CERTIFICATE OF CORRECTION

PATENT NO. : 7,652,803 B2
APPLICATION NO. : 11/730616
DATED : January 26, 2010
INVENTOR(S) : Tetsuroh Nakamura et al.

It is certified that error appears in the above-identified patent and that said Letters Patent is hereby corrected as shown below:

IN THE CLAIMS:

In Column 12, Line 27 (Claim 4), "in angle" should appear as --an angle--; and

In Column 13, Line 18 (Claim 14), "in angle" should appear as --an angle--.

Signed and Sealed this

Twenty-sixth Day of October, 2010

David J. Kappos
*Director of the United States Patent and Trademark Office*